United States Patent
Adams et al.

(10) Patent No.: US 7,706,066 B2
(45) Date of Patent: Apr. 27, 2010

(54) PORTABLE FRONT PROJECTION SCREEN ASSEMBLIES WITH FLEXIBLE SCREENS

(75) Inventors: Douglas Adams, Raleigh, NC (US);
Robert L. Wood, Cary, NC (US);
Edward Fadel, Hillsborough, NC (US);
Sean Hillard, Raleigh, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 302 days.

(21) Appl. No.: 11/970,820

(22) Filed: Jan. 8, 2008

(65) Prior Publication Data

US 2009/0122400 A1 May 14, 2009

Related U.S. Application Data

(60) Provisional application No. 60/986,406, filed on Nov. 8, 2007.

(51) Int. Cl.
*G03B 21/56* (2006.01)
(52) U.S. Cl. ........................ 359/443; 359/461
(58) Field of Classification Search ................ 359/443, 359/461; 160/23.1, 24
See application file for complete search history.

(56) References Cited

U.S. PATENT DOCUMENTS

| | | | |
|---|---|---|---|
| 3,251,264 A | | 5/1966 | Jacobson |
| 5,581,401 A * | | 12/1996 | Takamoto et al. ........... 359/443 |
| 5,706,130 A * | | 1/1998 | Rosen ........................ 359/443 |
| 5,798,861 A * | | 8/1998 | Doat .......................... 359/461 |
| 6,046,845 A * | | 4/2000 | Niwa et al. ................. 359/443 |
| D490,835 S | | 6/2004 | Kotera |
| D520,046 S | | 5/2006 | Miyagawa et al. |
| 7,092,166 B1 | | 8/2006 | Wood |
| 7,192,692 B2 | | 3/2007 | Wood et al. |
| D548,765 S | | 8/2007 | Kotera et al. |
| 7,262,912 B2 | | 8/2007 | Wood |
| D568,364 S | | 5/2008 | Jeoung et al. |
| 7,426,077 B2 * | | 9/2008 | Miyagawa et al. .......... 359/461 |
| 7,489,443 B2 | | 2/2009 | Congard et al. |
| 7,489,444 B1 | | 2/2009 | Adams et al. |
| 7,623,290 B2 * | | 11/2009 | Liang et al. ................. 359/443 |
| 2009/0067045 A1* | | 3/2009 | Yoshino et al. ............. 359/461 |

OTHER PUBLICATIONS

U.S. Appl. No. 29/297,297, Adams et al.

* cited by examiner

*Primary Examiner*—Christopher Mahoney
(74) *Attorney, Agent, or Firm*—Myers Bigel Sibley & Sajovec, P.A.

(57) ABSTRACT

Portable projection screen assemblies include: (a) a roller housing holding a roller with a flexible projection screen; (b) at least one substantially laterally extending screen support arm attached to the roller housing, the at least one screen support arm being configured to hold an outer edge portion of the flexible projection screen when the projection screen is in a laterally extended configuration; and (c) an outer housing case having an interior cavity sized and configured to hold the roller housing therein in a storage configuration. The roller housing is hingeably or releasably attached to the housing case and resides substantially vertically above the outer case in an operative position, whereby the outer housing case defines a support base adapted to reside on a support surface.

20 Claims, 30 Drawing Sheets

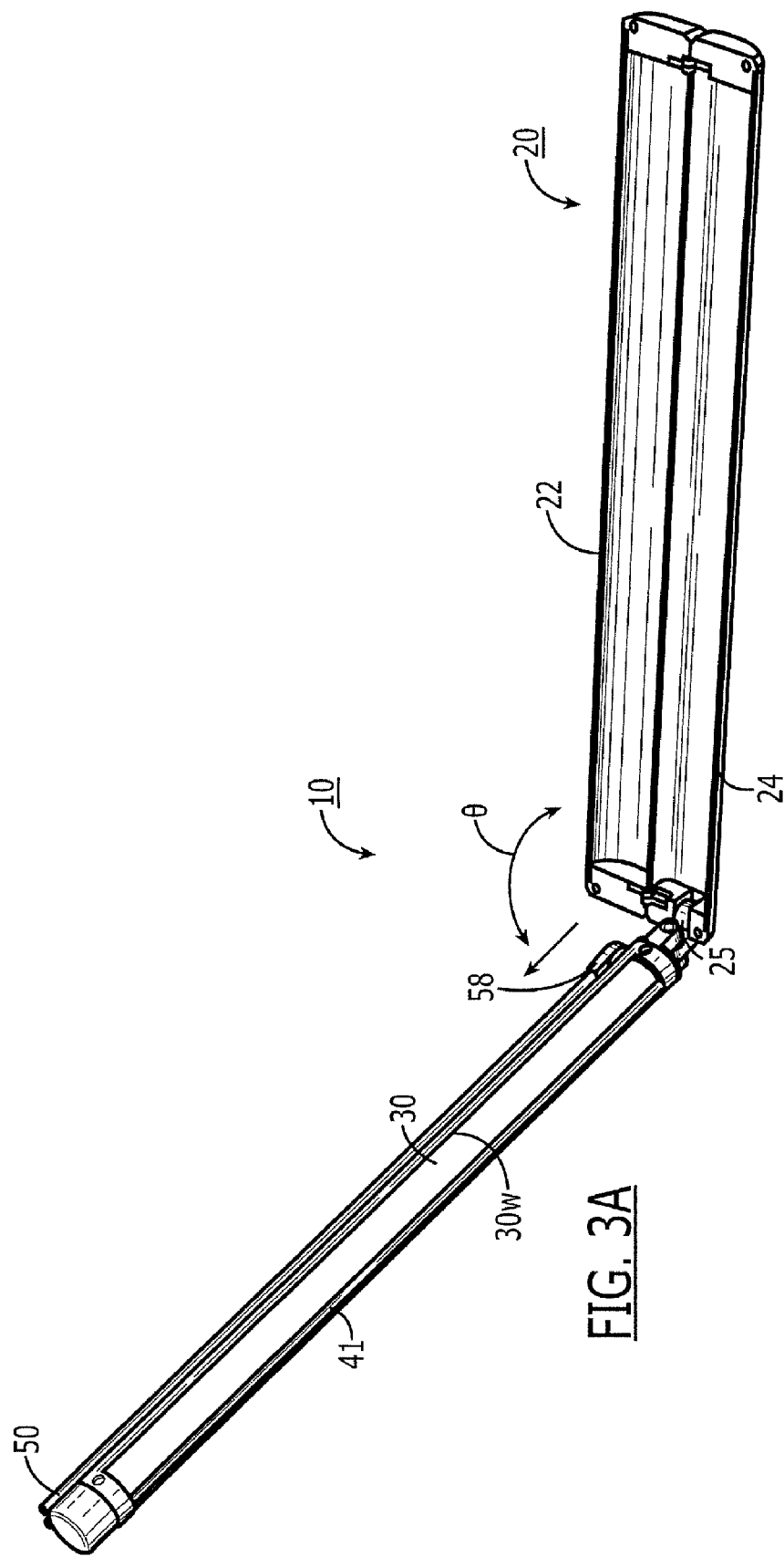

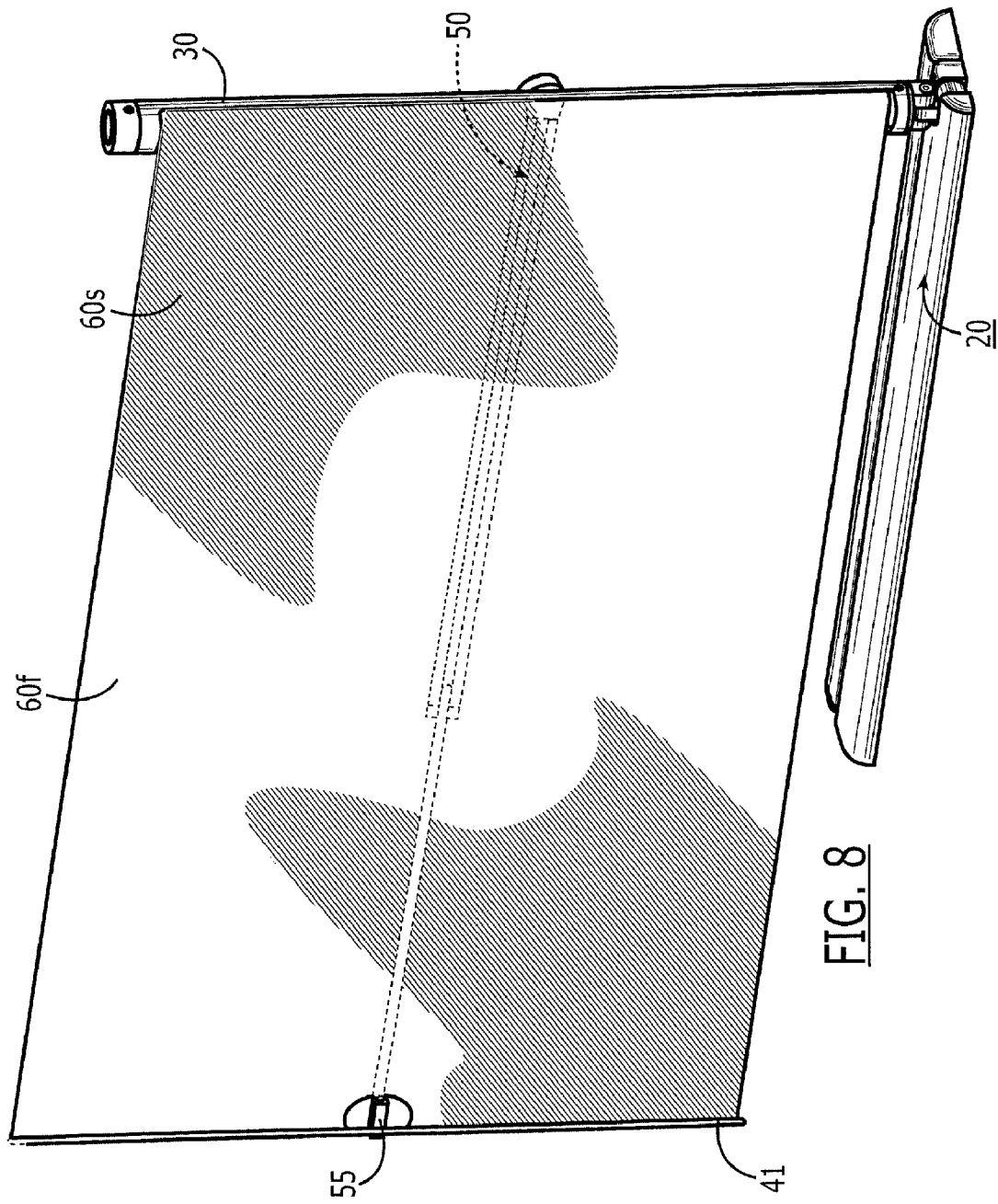

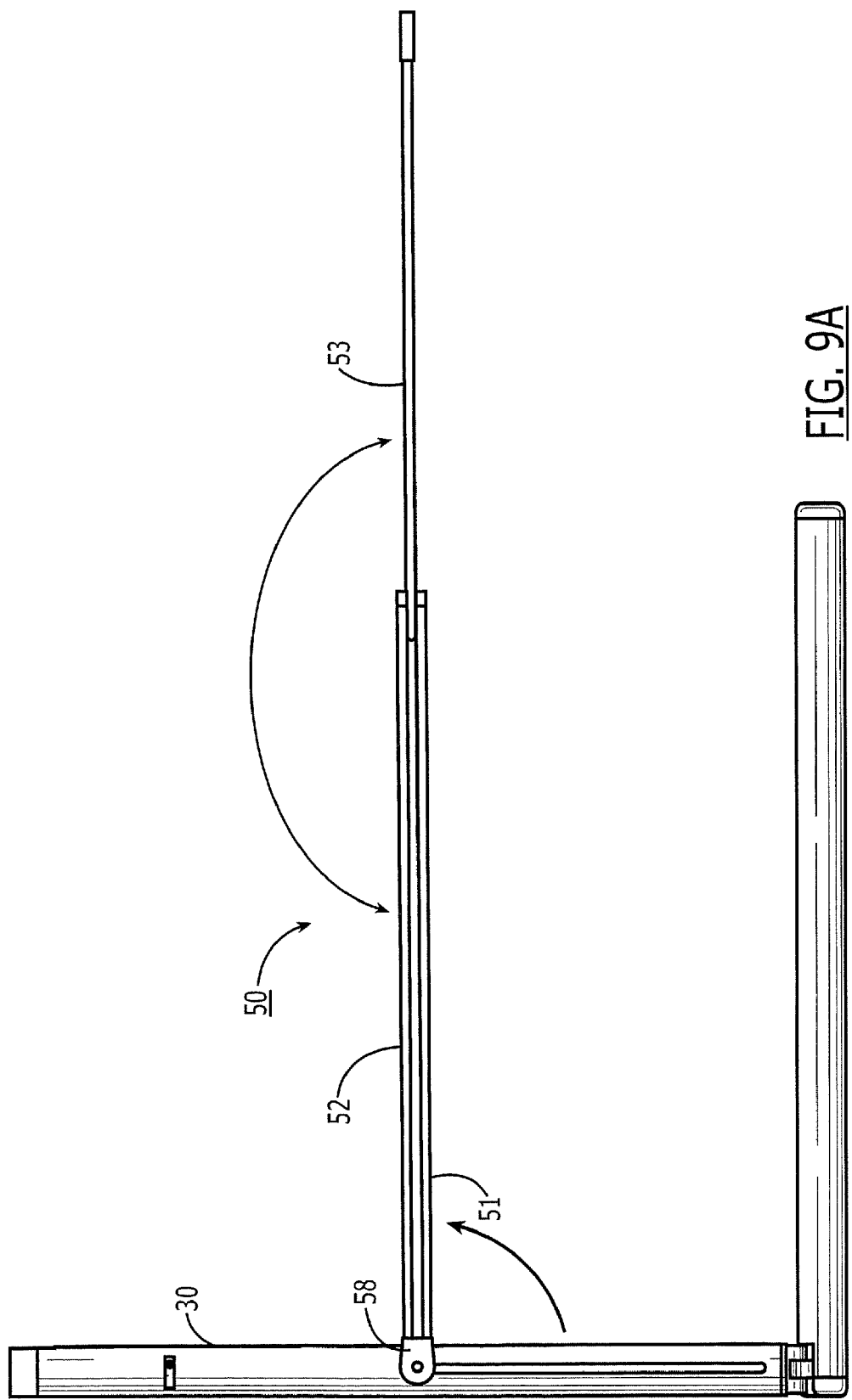

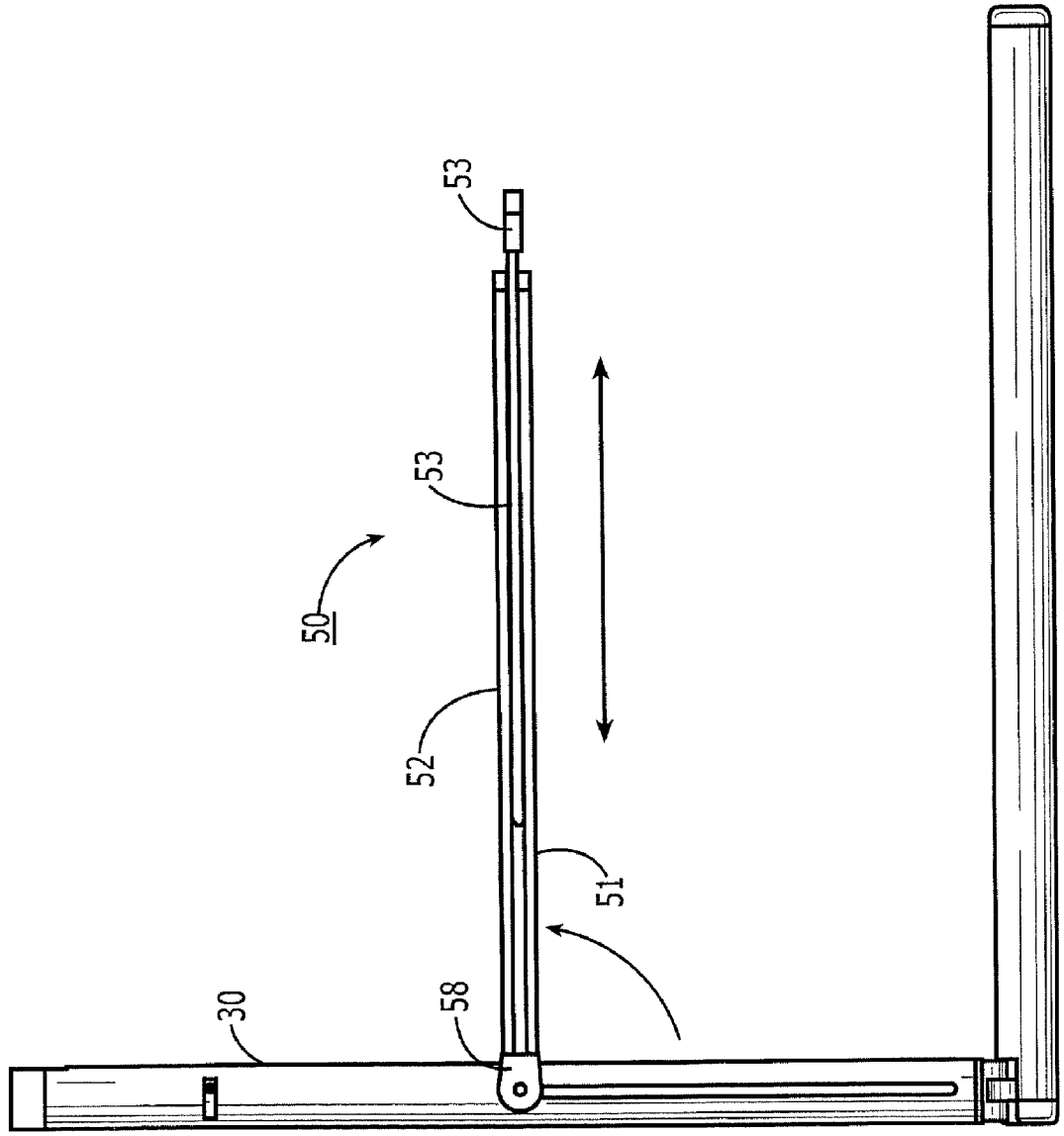

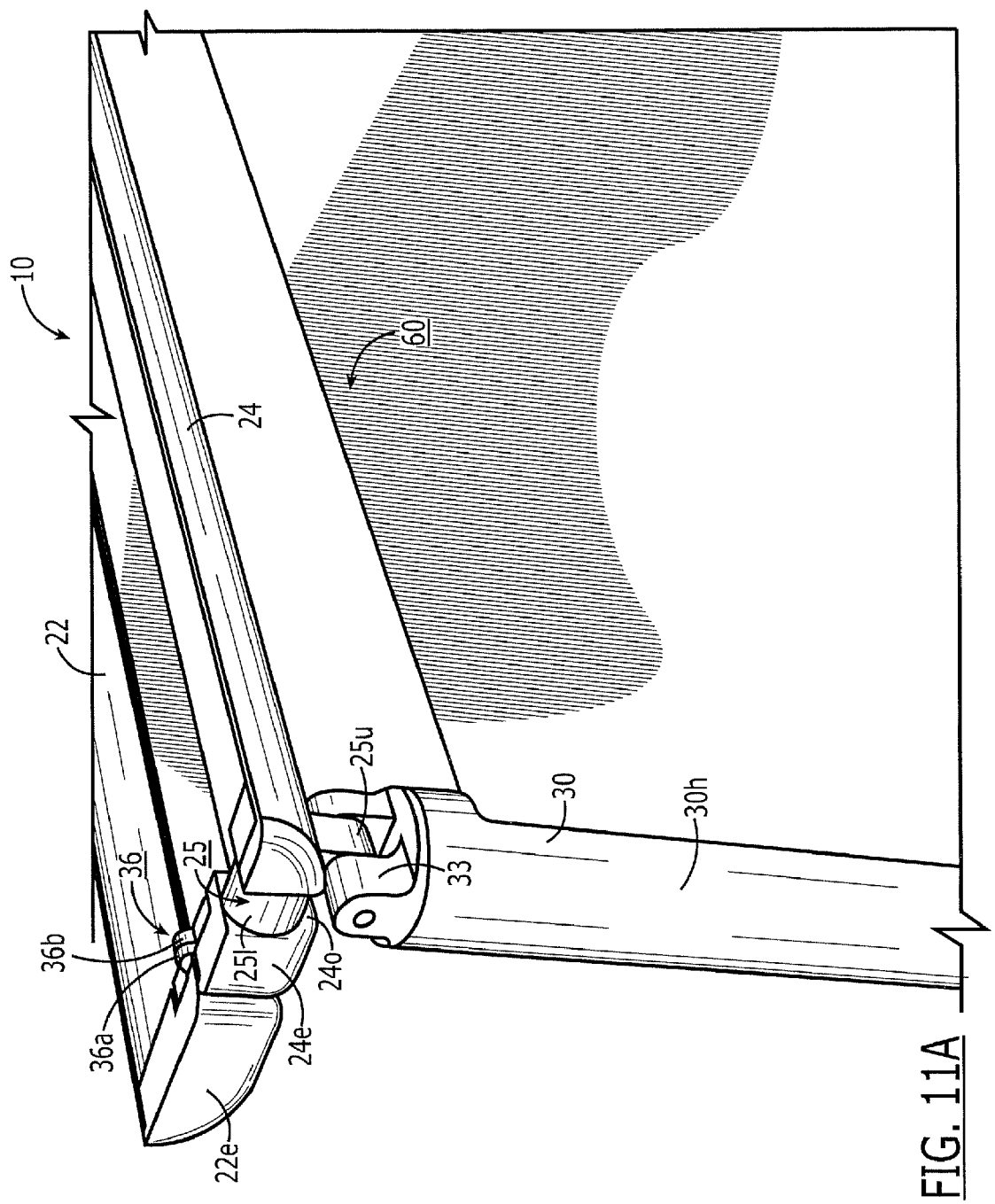

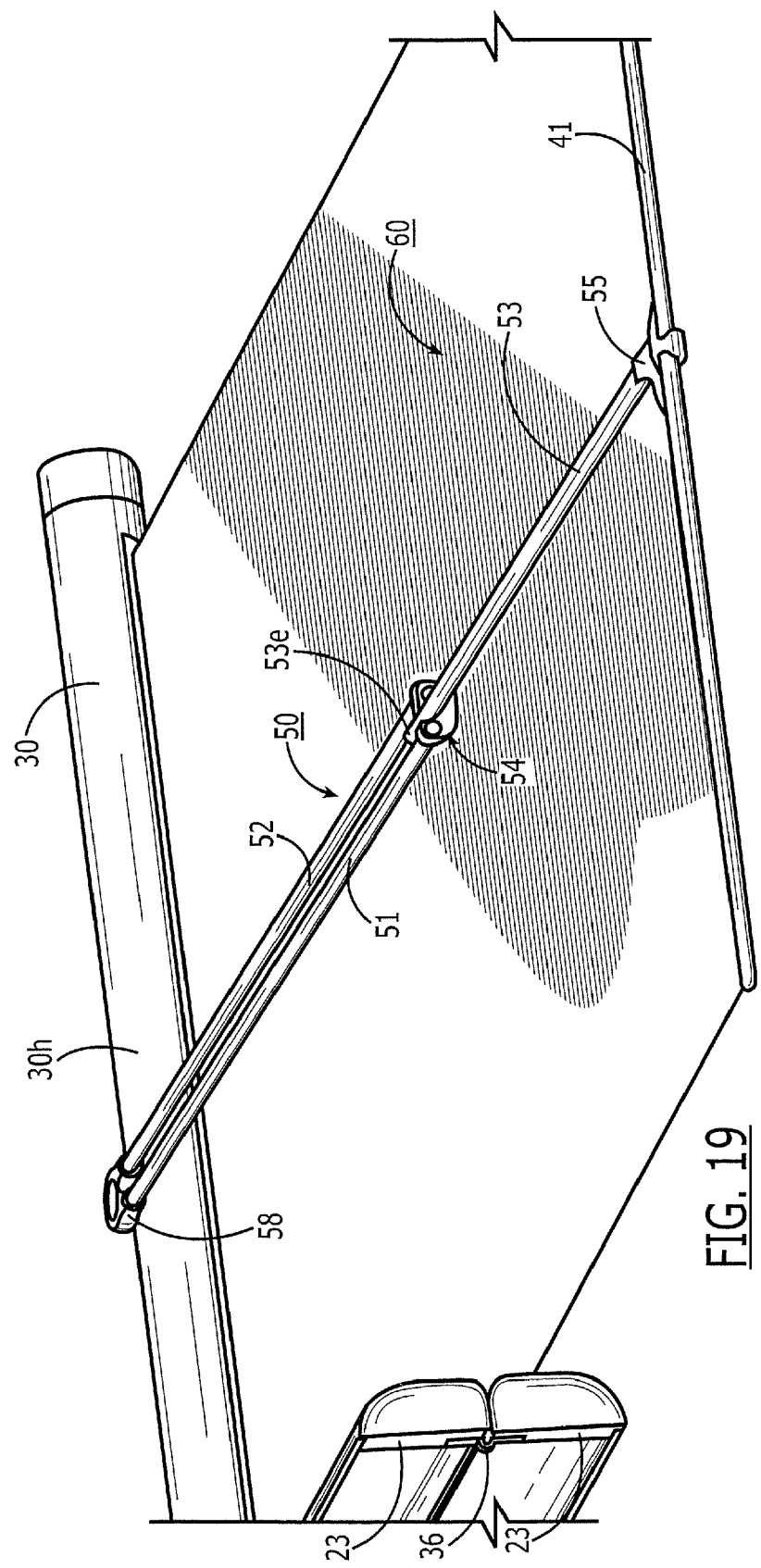

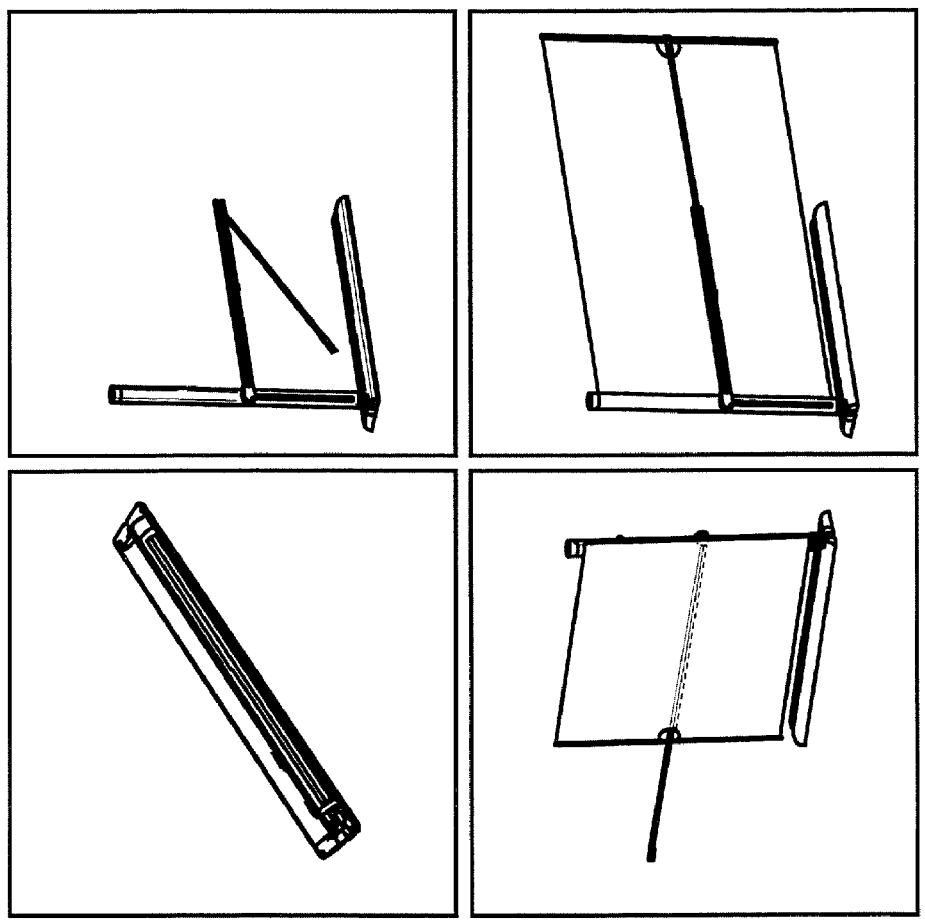
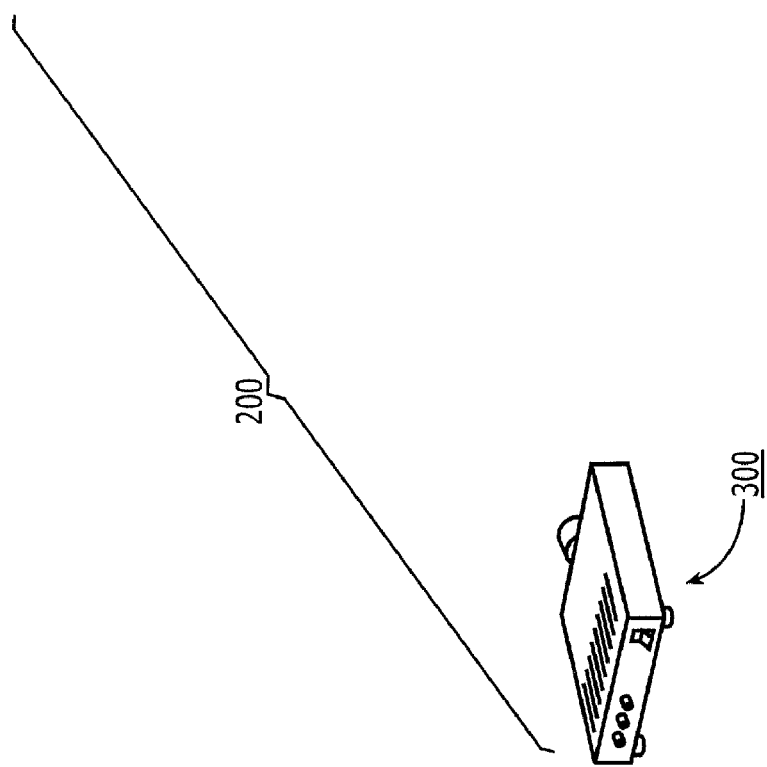
FIG. 22

PORTABLE FRONT PROJECTION SCREEN ASSEMBLIES WITH FLEXIBLE SCREENS

RELATED APPLICATION

This application claims the benefit of priority to U.S. Provisional Application Ser. No. 60/986,406 filed Nov. 8, 2007, the contents of which are hereby incorporated by reference as if recited in full herein.

FIELD OF THE INVENTION

This invention relates to front projection systems and particularly to front projection screens where the projector and viewer(s) are on the same side of the projection screen.

BACKGROUND OF THE INVENTION

Video projectors, used in conjunction with front projection screens (also referred to as reflective- or reflection-type projection screens), are a popular way to display video and computer imagery, and are commonly used in cinemas, home theaters and other consumer and commercial applications.

Front projection screens that are used in cinema or home theater applications generally are viewed in controlled illumination settings such as dark or subdued lighting conditions including, for example, windowless corporate meeting rooms, dedicated commercial or home theater installations and the like. In such controlled and/or dark room conditions, a suitably placed front projection screen, typically constructed with a matte white vinyl viewing surface, can deliver a sufficient and even superior viewing experience of the projected image.

With recent advances in reduced-cost, light-weight projectors, more users deploy projection systems in uncontrolled lighting. However, many commercially available screens lack an ability to effectively reduce or otherwise mitigate reflections of ambient illumination. Ambient illumination striking the projection screen surface produces a loss of contrast, and viewers perceive the image to be washed out in brightly lit settings. This is especially noticeable with mid- and/or lower-luminance projectors. However, in some situations, such as business meetings, lectures or other educational events, or in personal uses like multi-player or single player on-screen gaming and/or portable theater, it may be desirable to use projection devices in high-ambient or uncontrolled lighting situations. Coupled with the advances in portable projectors there is an emerging need for portable projection screens for use in mixed-light and/or environments with uncontrolled ambient illumination.

SUMMARY OF EMBODIMENTS OF THE INVENTION

Embodiments of the invention are directed to portable projection screen assemblies and/or systems that may be particularly suitable for use in mixed light conditions.

Some embodiments are directed to portable projection screen assemblies that include: (a) a roller housing holding a roller with a flexible projection screen; (b) at least one substantially laterally extending screen support arm attached to the roller housing, the at least one screen support arm is configured to hold an outer edge portion of the flexible projection screen when the projection screen is in a laterally extended configuration; and (c) an outer housing case having an interior cavity sized and configured to hold the roller housing therein in a storage configuration. The roller housing is hingeably attached or releasably attached to the housing case and resides substantially vertically above the outer case in an operative position whereby the outer housing case defines a support base adapted to reside on a support surface.

The at least one screen support arm may be rotatably attached to the roller housing whereby the at least one screen support arm is configured to rotate from a substantially longitudinally extending storage configuration adjacent to or in the roller housing to the substantially laterally extending operative configuration.

Other embodiments are directed to portable projection screen assemblies that include a first elongate housing member having an axially extending elongate interior channel and a second elongate housing member attached to the first elongate housing member, the second housing member having an axially extending elongate interior channel. The first and second housing members are configured to matably attach to define a closed configuration whereby at least a major portion of a length of the respective interior channels are aligned with each other to define an interior cavity. The first and second housing members are configured to open to an open configuration whereby the first and second housing members reside side-by-side to expose the respective interior channels and define a support base. The screen assemblies also include a roller housing holding a roller therein, the roller housing is pivotably attached to one end portion of the first housing member, whereby the roller housing resides in the interior cavity when the first and second housing members are in the closed configuration and extends above the first and second housing members in an operative position when the first and second housing members are in the open configuration. The screen assemblies also includes at least one screen support arm having first and second opposing end portions, the first end portion being rotatably attached to the roller housing whereby the at least one screen support arm rotates from a longitudinally extending storage position that is in or adjacent the roller housing to an outwardly extending operative position and a flexible projection screen mounted on the roller and configured to laterally roll and unroll between stored and operative positions, the projection screen having a high gain and a high Ambient Rejection Ratio (ARR). In the operative position, an outer edge portion of the flexible projection screen is attached to the at least one screen support arm. Also, in the operative position, the roller housing extends substantially vertically above the support base that resides on a support surface and the at least one screen support arm extends substantially laterally outwardly substantially orthogonal to the roller housing to hold the flexible screen laterally extended.

Yet other embodiments are directed to methods of setting-up a projection screen assembly. The methods include: (a) providing a flexible projection screen held on a roller in a roller housing inside a casing cavity having matably attached hinged first and second elongate housing members; (b) opening the first and second housing members to expose the roller housing; (c) pivoting the roller housing out of an end portion of the first housing member to an upstanding substantially vertical position; (d) extending at least one screen support arm outwardly from the roller housing; (e) laterally extending the flexible projection screen from the roller housing to a viewing configuration and attaching the at least one screen support arm to an outer edge portion of the flexible screen; and (f) placing the casing cavity face down on a support surface to thereby provide a projector screen support base that supports the flexible screen in the viewing configuration.

Still other embodiments are directed to low-lumen portable projector systems with a projection screen assembly, including: a portable low-lumen projector; and a projection screen assembly adapted to receive light and images from the portable low-lumen projector. The projection screen assembly includes: (a) a roller housing holding a roller with a flexible projection screen therein so that the flexible screen can roll and unroll therefrom; (b) at least one screen support arm rotatably attached to the roller housing, wherein the at least one screen support arm is configured to rotate from a substantially longitudinally extending storage configuration to a substantially laterally extending operative configuration; and (c) an outer case housing pivotably attached to a lower end portion of the roller housing, the outer case housing having an interior cavity sized and configured to hold the roller housing therein in a storage configuration. The roller housing is configured to rotate out of the interior cavity and reside vertically above the outer case in an operative position whereby the outer case defines a support base for the roller housing and screen.

In some embodiments, the portable projection screens can be compact and have a low profile, and the screen can be a high-contrast screen for use in ambient illumination with a standard viewing configuration, e.g., providing one of a 4:3 or 16:9 aspect ratio.

BRIEF DESCRIPTION OF THE DRAWINGS

FIG. 3A is a top perspective view of the screen assembly shown in FIG. 2 illustrating a roller housing body rotated out of the open outer casing according to exemplary embodiments of the present invention.

FIG. 8 is a front perspective view of the screen assembly shown in FIG. 4 with the screen shown with a flexible substrate with a transparent screen film on a portion thereof for discussion.

FIGS. 9A-9H are schematic illustrations of exemplary screen arm support configurations according to embodiments of the present invention.

FIG. 11A is a partial bottom front perspective view of the screen assembly shown in FIGS. 1, 2 and 3A according to embodiments of the present invention.

FIG. 19 is a side rear perspective view of the screen assembly shown in FIG. 18 with the roller body housing in place according to embodiments of the present invention.

FIG. 22 is a schematic illustration of a low-lumen projector system with a projector screen assembly according to embodiments of the present invention.

DETAILED DESCRIPTION

Figure 1:
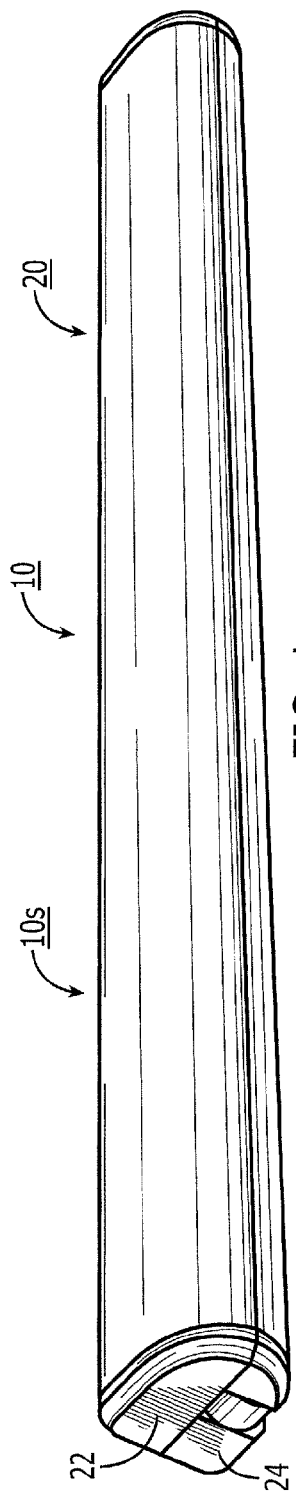
FIG. 1 is a side perspective view of a portable front projection screen assembly in a closed (storage) configuration according to exemplary embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. In particular, as used herein, the relative terms "first direction" and "second direction" mean two different, not necessarily orthogonal, directions, whereas the terms "horizontal" and "vertical" indicate specific orientations based upon the ultimate orientation of the projection screen. Moreover, the terms "front" and "back" are used herein to describe opposing outward faces of a front projection screen. Conventionally, the viewing face is deemed the front.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Front projection systems rely on a projector which produces a generally high-intensity image which is focused and/or directed onto the projection screen. The reflected image from the screen is what viewers perceive. When the projected/reflected image is substantially brighter than the ambient surround viewers experience the image as being sufficiently bright. A number of terms are used to characterize the performance of the projection screen in a projection system.

The term "gain" is a dimensionless ratio of the measured luminance of a particular screen (the numerator), measured on-axis, to the luminance of a white diffuse standard (Lambertian white reflector) (the denominator) under identical, substantially collimated illumination. Conventional projection screens have gains ranging from 0.9 to 2.5. The term "high-gain" refers to a screen with a gain of 3.0 or higher. In some embodiments, some high-gain screens can have a gain that is between about 4-10 (or even greater), including, for example, between about 6-8. High gain can be an important attribute for screens used with low-luminance projectors because a high gain screen allows a low luminance projector to create a bright image with a luminous flux equivalent to a much brighter projector being used with a conventional projection screen.

The term "half-angle" refers to the measure or angle from normal to the front face of the projection screen where the intensity of reflected illumination is half the intensity of its maximum on-axis intensity. Depending on the construction of the projection screen, half-angles may be symmetric or asymmetric. Half-angle is an objective measure of field-of-view for a particular screen, which is a proportional measure of how far a viewer may deviate from a centered, normal viewing of the projection screen.

In the present context, the term "high-contrast" describes an image projected and illuminated by the projection system which is characterized by a wide (optical) dynamic range and that ambient illumination which may strike the projection screen does not significantly diminish the dynamic range of the presented image.

The term "Ambient Rejection Ratio" (ARR) is a dimensionless number which gives an indication of the ability of the projection screen to discriminate in favor of reflecting projected images back toward a viewer(s) while efficiently shunting ambient reflected light away from the viewer(s). The ARR is the ratio of the diffuse-reflectance source (DS) to the diffuse reflectance-ambience (DA—both of these described and defined below), and is a convenient measure or figure of merit of how well the screen rejects ambient illumination. Most conventional front projection screens have an ARR between 0.98 and 1.15. The term "high" ARR refers to screens with an ARR of at least 1.20. A white Lambertian reflectance standard has an ARR of 1. A projection screen with an ARR of between about 1.3 and 1.6 generally shows a reasonable trade-off between an ability to partially reject ambient illumination and the on axis illumination of the projected image. Some embodiments are directed to high ARR projection screens with ARRs typically between about 1.25 and 2. Higher ARRs may be available in the future and high ARR screens contemplated for use with the present invention are not limited to the 1.25-2 ARR range. A projection screen with a high ARR allows for the projection screen to be particularly useful in mixed ambient lighting conditions because image contrast is better maintained when the artifacts of ambient illumination are diminished.

The term "diffuse reflectance-source" (DS) is a ratio that evaluates how efficiently the screen distributes a projected image back into ambient surround. This diffuse reflectance-source ratio is a dimensionless ratio of a luminance signal of the projection screen (numerator) divided by a luminance signal of a white standard (denominator). As with the gain measurement described above, the luminance signal is provided by substantially collimated illumination delivered to samples held in place at the sampling port of an integrating sphere and the signal is measured by a detector placed at an oblique angle from the source and screen.

Figure 23A:
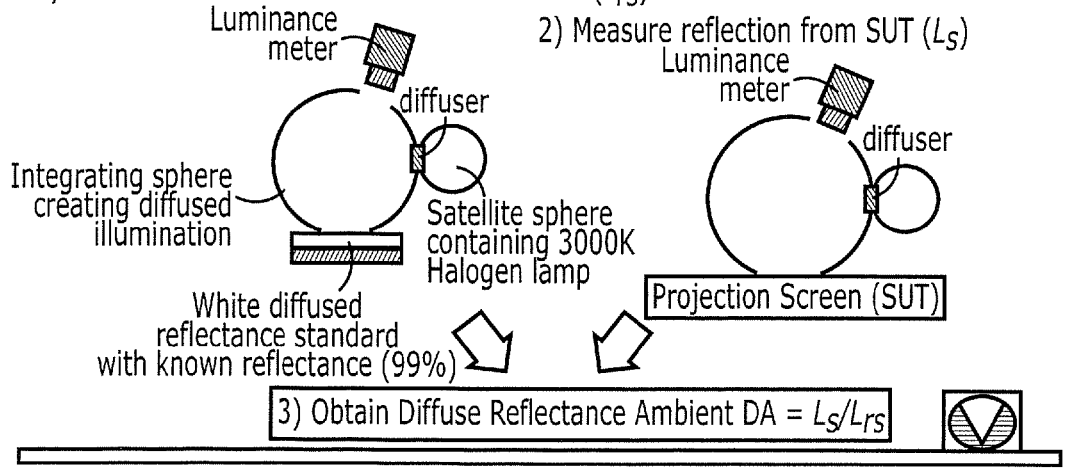
FIGS. 23A and 23B are schematic illustrations of procedures for evaluating the Ambient Rejection Ratio (ARR) of a screen.
Figure 23B:
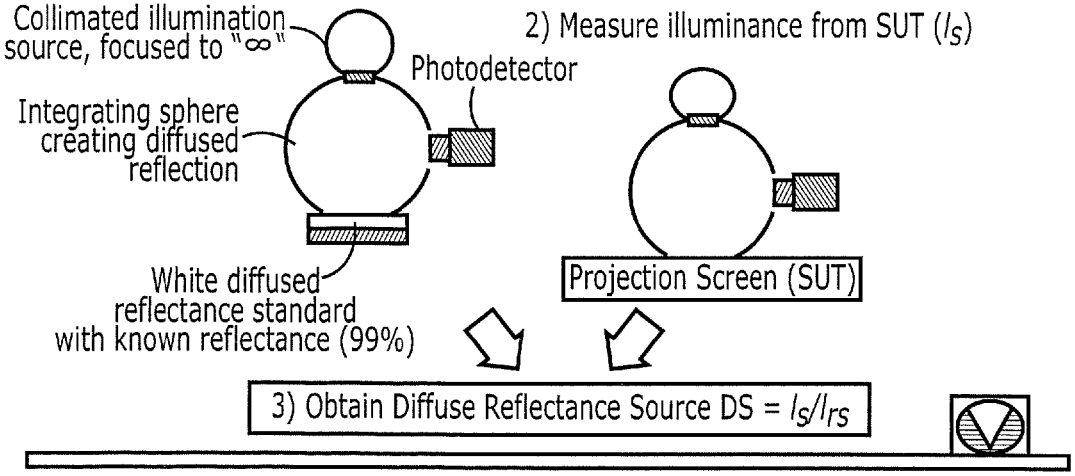

The term "diffuse reflectance-ambient" (DA) is a ratio that evaluates how efficiently the screen distributes the ambient illumination back to the projection screen viewer. The diffuse reflectance-ambient ratio is a dimensionless ratio of the illuminance signal of the projection screen (numerator) divided by the illuminance signal of a white standard (denominator). The illuminance signal is delivered to samples held in place at the sampling port of an integrating sphere, where the illumination source is diffuse and oblique from the samples and the signal is measured by a detector placed normal to sample. FIGS. 23A and 23B schematically illustrate measurement procedures for the DS and DA ratios.

The terms "low-luminance" or "low lumen" refer to front projectors that have illumination at less than about 500 lumens or less, typically ranging between about 5-500 lumens. A "micro" projector is characterized by a small physical enclosure and has a luminous flux of 200 lumens or less. A subclass of the low lumen projectors is the "ultra-low-lumen" projectors, also known as the "picoprojectors" which are characterized by an extremely small enclosure (5-25 cubic centimeters) and a luminous output of between about 10-20 lumens or even less. Examples of low-power and/or low-luminance projectors include, but are not limited to, LED/DLP illuminated projector systems, which may be low-lumen, low power and light weight (typically about 5-10 pounds or even less). Recent examples of microprojectors include the LG Electronics HS-101, 100 lumen, LED/DLP-based projector and the Boxlight (Poulsbo, Wash.) Bumble-Bee, a LED/DLP, sub-100 lumen projector.

Different projectors and different viewing environments and/or applications may warrant projection screens with different screen characteristics (typically quantified in gain, half-angle, ARR) for maximal effectiveness. Screen production techniques such as those described in U.S. Pat. No. 7,092,166 B1 (Wood), U.S. Pat. No. 7,192,692 B2 (Wood et al.), and U.S. Pat No. 7,262,912 B2 (Wood II) provide a microlens-based design and implementation mechanisms in which all these attributes can be controlled and optimized in ways believed to have been previously unavailable to screen designers. The contents of these patents are hereby incorporated by reference as if recited in full herein.

The screens of the instant invention are particularly suitable for use with low-lumen and/or low-power and light-weight projectors in uncontrolled lighting conditions, e.g., mixed ambient lighting conditions, rather than controlled darkened (windowless) rooms, where there may be a need to create a bright image from low-power imaging source and to create a projection screen that can maximize the perceived contrast of the image in the uncontrolled environment.

Although the present embodiments are directed for use with low-lumen, lightweight projectors, the present invention is not limited thereto and the screens may also be used with mid or high-lumen outputs. The term "mid-lumen" refers to projectors with lumen outputs above 500 lumens and below about 3,000 lumens.

For some embodiments, which may be particularly suitable for use with ultra-low luminance projectors, e.g., sub-100 lumen projectors, the projection screen can have an ARR of at least about 1.4 and a high-gain luminance of about 6 or greater.

The projection screens of some embodiments of the invention may be particularly suitable as portable high-gain and high ARR screens for front projectors, including personal-use devices incorporating low-power projectors. Examples of such devices include pervasive computer devices with embedded projectors, such as microprojectors or picoprojectors, include, for example, laptop computers, handheld computers, PDAs, multi or single player gaming devices and cellular telephones. The term "personal" with respect to a screen refers to a small-viewing area screen sized and configured for concurrent substantially on-axis viewing by the user and/or a small audience such as between about 1-6 persons.

Figure 2:
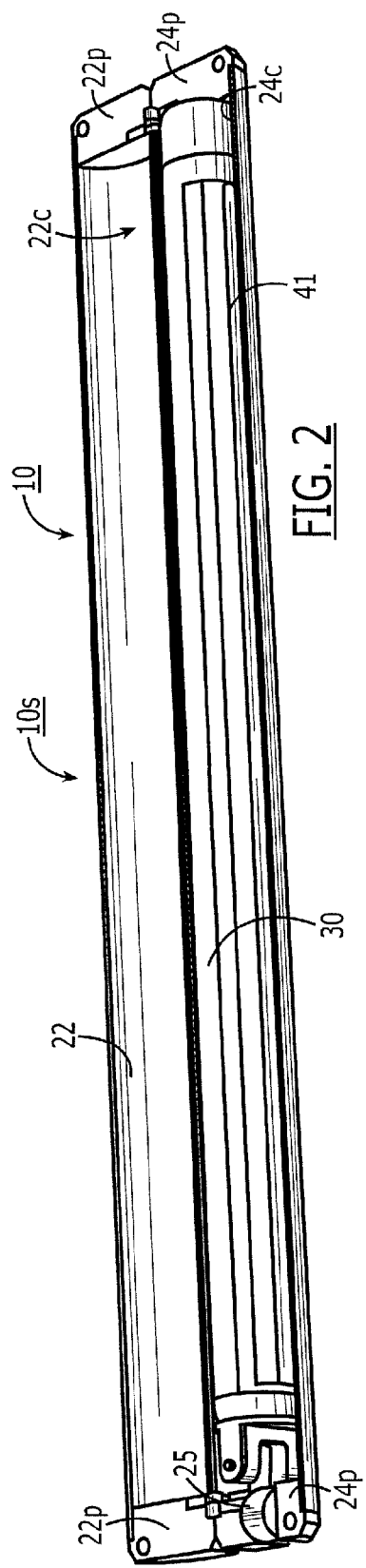
FIG. 2 is a side perspective view of the front projection screen assembly of FIG. 1 illustrating the outer casing in an open configuration according to embodiments of the present invention.

Referring now to the figures, FIGS. 1 and 2 illustrate a projection screen assembly 10 with an outer casing or housing 20. The casing 20 is sized and configured to hold a roller housing body 30 that holds a roller 30R (FIG. 14) and a flexible projection screen 60 (FIG. 4) therein. The flexible screen 60 can include an outermost edge portion or a leading edge with a vertically extending support 41 having increased rigidity compared to the adjacent portion of the screen 60. As shown in FIG. 2, this screen edge 41 can reside retracted into the roller housing body, or it may be flush or extend slightly beyond the bounds of the roller body housing 30 for ease of storage in the cavity 24c. As shown, the casing 20 can include matable first and second housing members 22, 24. The members 22, 24 can be hingeably attached 36 (FIGS. 11A, 12) at one or more locations, such as, for example at one or more locations along adjacent long inner side wall edges, such as at opposing end portions, or at one or more other suitable locations. In other embodiments, the two members 22, 24 may be configured to snap apart or otherwise be removable from each other to expose the roller body 30 (not shown).

As shown in FIG. 2, one respective long edge of the two (elongate) outer casing or housing members 22, 24 can open and rotate away from the other at about 180 degrees. The two members 22, 24 each include a respective inner or interior cavity 22c, 24c. The cavities 22c, 24c are sized and configured to cooperate to hold the roller body 30 therein, when closed. The roller body 30 can be tubular and the cavities can each have a semi-circular shape that closely fits about the roller body 30 when closed. However, the casing housing members 22, 24 and/or cavities may have other shapes; for example, one may be circular to hold the roller body 30 and the other can be flat. As also shown, the members 22, 24 include planar support surfaces 22p, 24p on opposing long end portions thereof that contact the target table, chair, ledge or other support surface during use.

Figure 5:
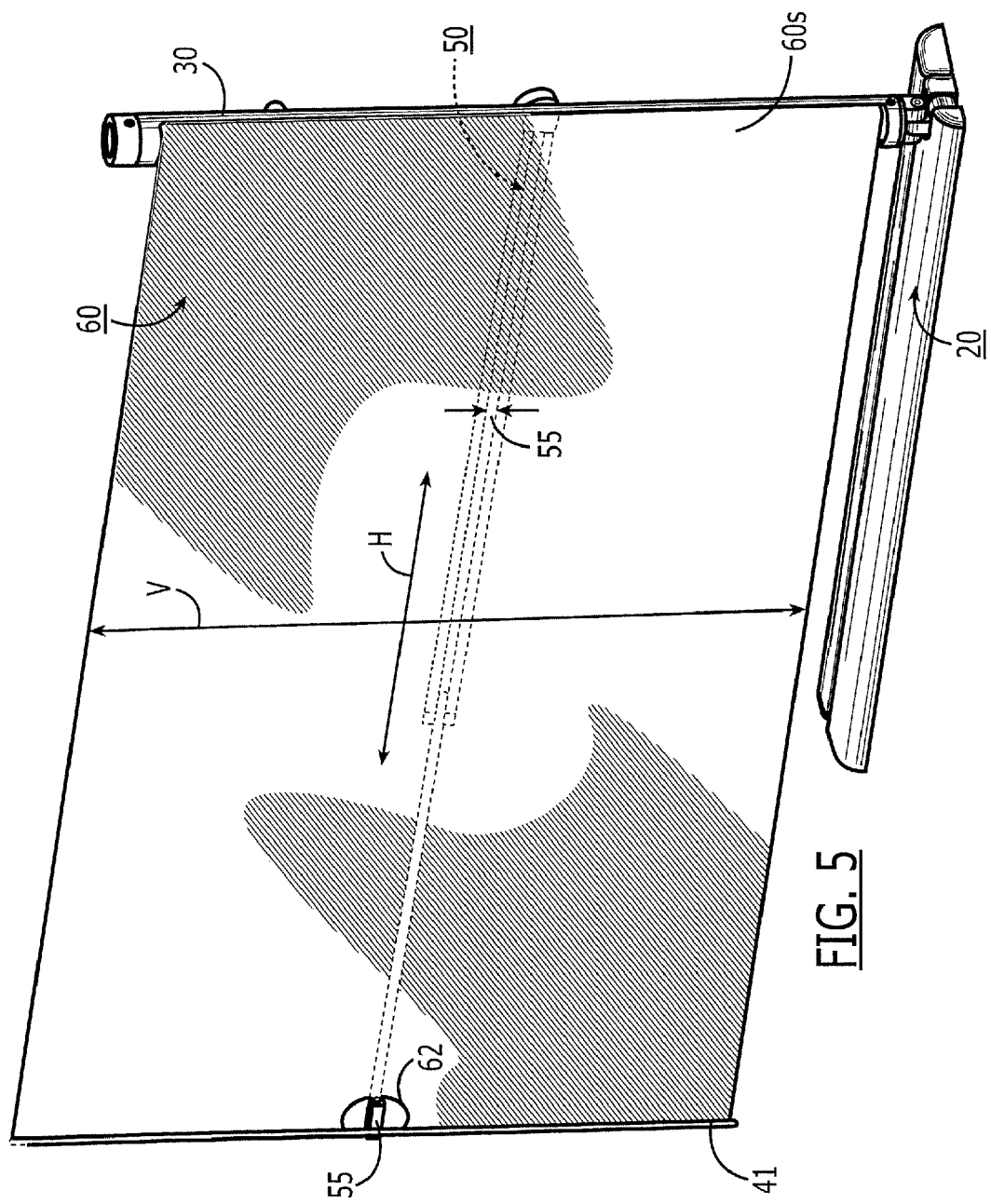
FIG. 5 is a front perspective view of the screen assembly shown in FIG. 4, illustrating the front projection screen laterally extended and held by the support arm (with the support arm shown behind the screen to illustrate the structure although the arm would be visually blocked by the screen in actual use) according to exemplary embodiments of the present invention.

The roller body housing 30 holds a roller 30R (FIGS. 16, 17) (e.g., a take-up reel) that can wind and unwind the projection screen 60 between a storage configuration (FIG. 1) and at least one viewing configuration(s) (FIG. 5). The screen 60 opens side-to-side and hold the screen 60 laterally extended in tension. The first and second housing members 22, 24 can close together to matably attach and/or close into a compact (portable) storage configuration 10s with the screen 60 encased therein as shown in FIGS. 1 and 2.

In other embodiments, the casing 20 can be a single-piece, substantially rigid body that holds the roller body housing 30 during storage and also act as a support base for the screen assembly 10 when in the operative configuration (not shown). For the single-piece casing configuration, the casing 20 can have a compact, substantially cylindrical shape with an open lower cavity that releasably holds the roller body housing 30. The perimeter of the bottom-facing portion of the casing 20 may include substantially planar support surfaces. In other embodiments, the casing 20 can have a substantially closed shape that has an end portion that slidably receives and releasably holds the roller body housing 30 such that the roller body housing can be slidably extracted or removed therefrom (also not shown). The lower portion of the closed shape casing can include a planar support surface and/or reside on a support platform.

Referring again to FIG. 1, the screen assembly 10 can have a compact low-profile shape with rounded cross-sectional profile. The two housing members 22, 24 can be turned face down (FIG. 4) with the open cavities 22c, 24c facing down to form the support surface for the screen. In other embodiments, the roller body 30 can be rotated or removed from the housing 20, the members 22, 24 being closed together to define the support base (not shown). A flat side (typically the bottom side) or a side with flat portions can provide the screen support surface.

Referring to FIG. 2, in some embodiments, the roller body housing 30 is hingeably attached via a hinge 25 at one end portion of the first housing member 24. FIG. 3A illustrates the roller body housing 30 rotated up and out of the cavity 24c. To get to the fully extended (operative support) configuration, the roller body housing 30 can rotate through a rotation angle ($\Phi$) that positions the roller body housing 30 vertically above the outer casing 20 in a direction that is away from the interior cavities 22c, 24c. The rotation angle $\Phi$ can be about 270 degrees. This positions the roller body housing 30 so that the screen window 30w faces outwardly to allow the screen 60 to be laterally extended in substantially the same direction as the orientation of the lower elongate housing members 22, 24.

Figure 3B:
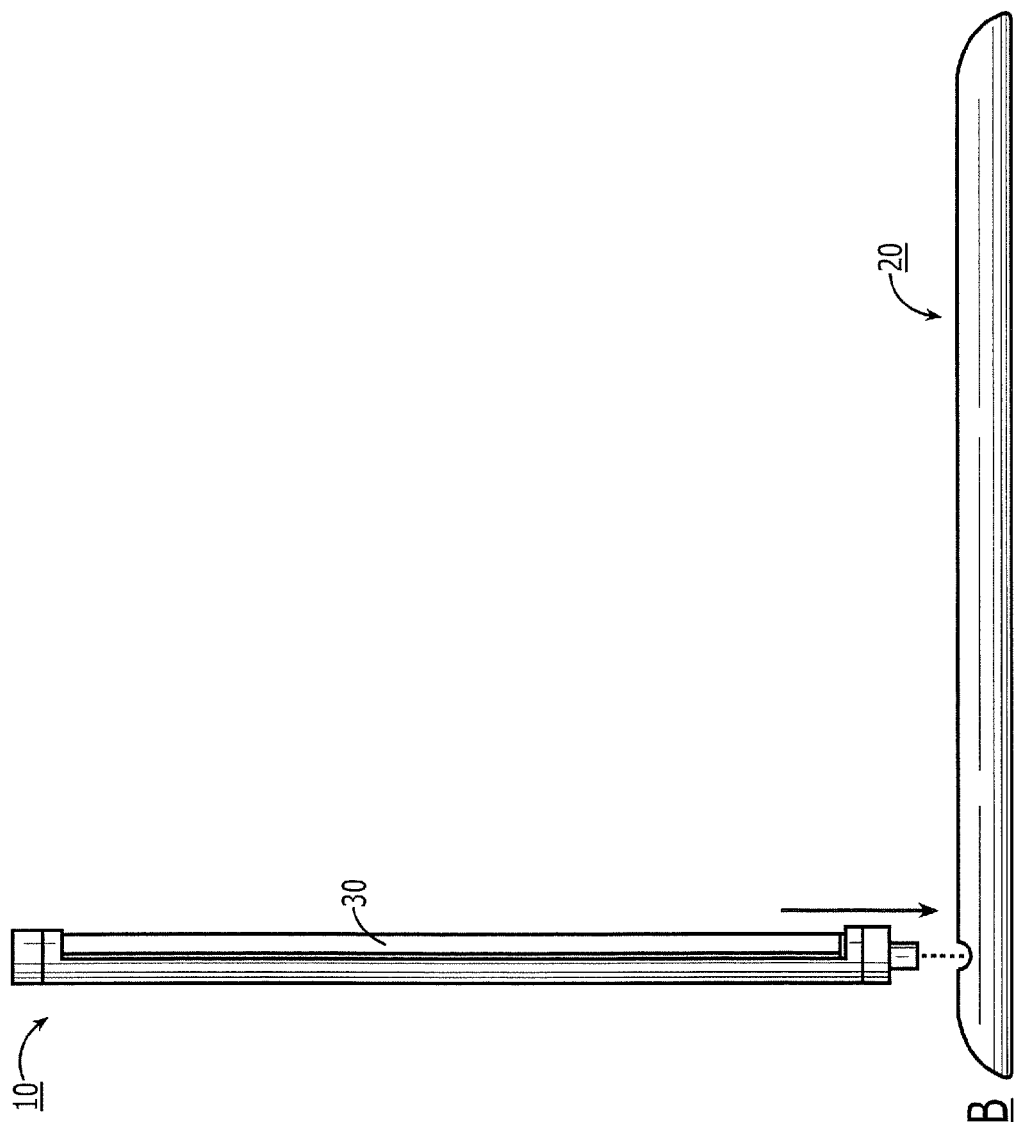
FIG. 3B is a schematic illustration of an alternative embodiment of the screen assembly shown in FIGS. 1 and 2, with the roller housing body being stored inside the casing and releasably attachable (mountable) to an outer portion of the screen assembly casing/housing according to other embodiments of the present invention.

FIG. 3B illustrates an alternative embodiment from the embodiment shown in FIG. 2. As shown, the roller body 30 can be releasably attachable to an outer surface of the casing housing 20. The roller body 30 can still be stored inside the casing housing, and removed for use attached by a user. The releasable attachment can be any means for releasable mechanical engagement that can provide sufficient structural rigidity for the roller body and housing 30, such as, but not limited to, frictional engagements (e.g., "snap fit"), bayonet fittings, slot and key fittings, threaded (screw) engagements and the like.

Figure 4:
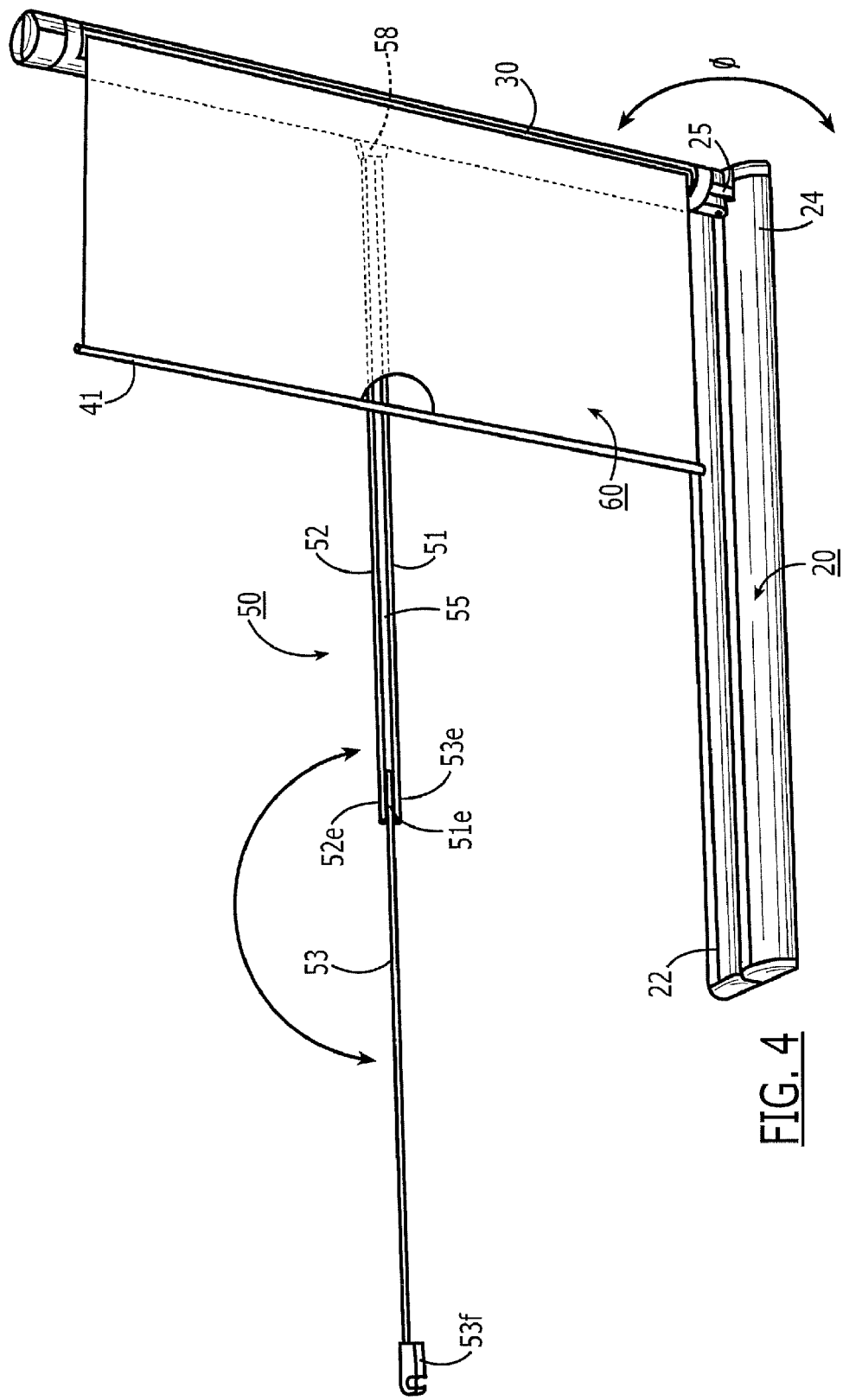
FIG. 4 is a side perspective view of the screen assembly shown in FIGS. 1, 2 and 3A, illustrating the projection screen being partially laterally extended along with a laterally extending support arm according to exemplary embodiments of the present invention.

FIG. 4 illustrates the roller body 30 in the operative extended position above the casing 20. FIGS. 3A and 4 also illustrate that the screen assembly 10 can include at least one screen support arm 50 that extends substantially laterally, typically substantially orthogonal to the roller body 30, to support the screen 60. The screen 60 is shown in a partially laterally extended configuration in this figure. As shown in FIG. 3A, the at least one screen support arm 50 can reside adjacent the roller body housing 30 or in a vertically extending groove or channel during storage. The screen support arm 50 can rotate away from the roller body 30 into the operative position shown in FIG. 4. The screen support arm 50 can have a number of different configurations, examples of which will be discussed further below. FIGS. 3A and 4 illustrate two of these configurations.

As shown in FIG. 3A, the support arm 50 can be a single elongate arm that can be slidably and rotatably mounted to the roller body housing 30. During set-up, a user can slide a mounting member 58 associated with the at least one arm 50 up a vertically extending channel 30c (FIG. 11B) until the mounting member 50 and arm 50 are at a desired vertical position, then the at least one arm 50 can be rotated outward to extend laterally outward.

Figure 9B:
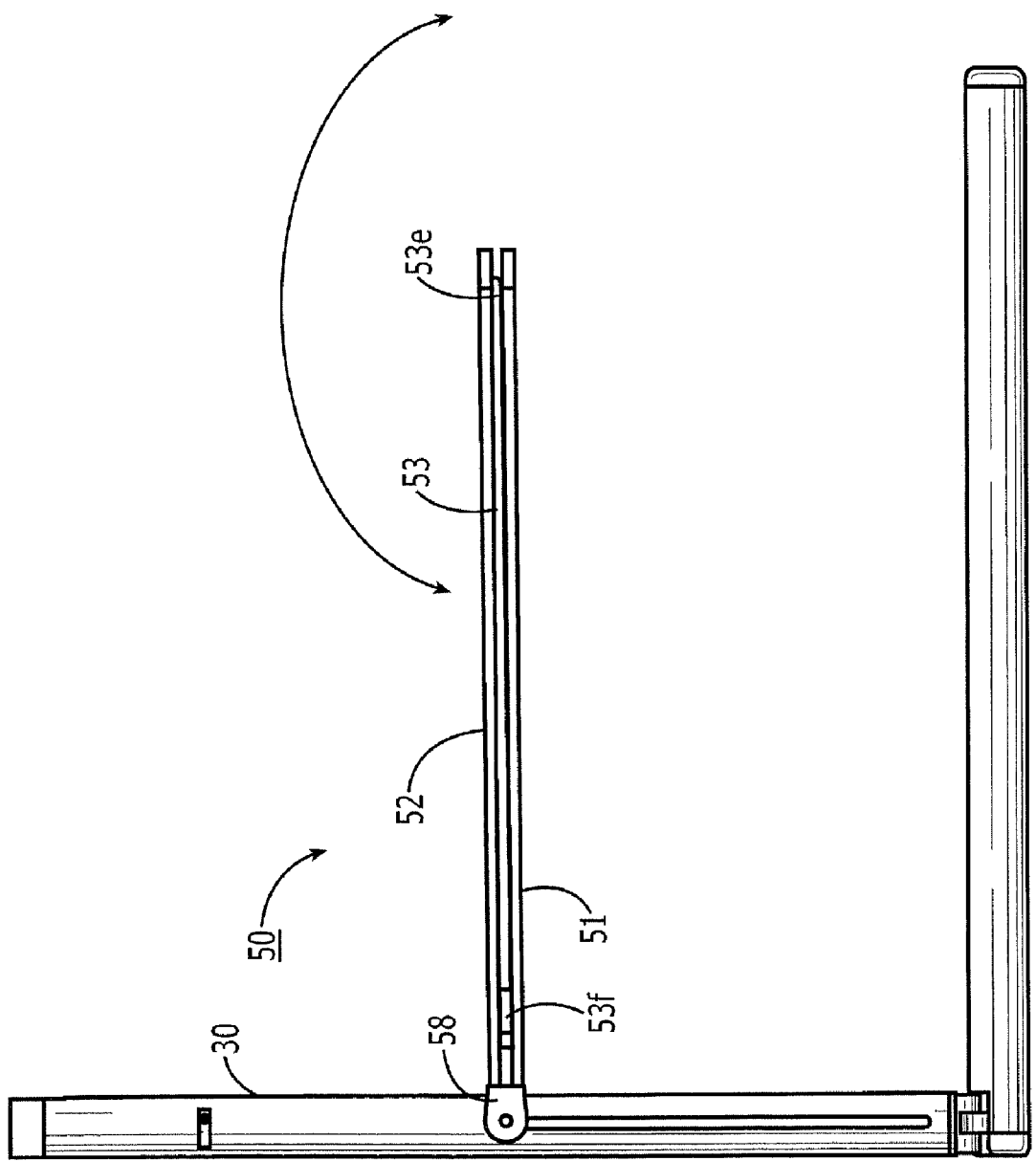

FIG. 4 illustrates that the arm 50 can be configured with a pair of closely spaced parallel arms (an arm pair) 51, 52 that define an open region 55 therebetween. A third arm 53 can be pivotably attached to an outer end portion thereof. The third arm 53 can pivot so that the free end 53f extends laterally away from the roller body 30 during use and so that the arm 53 resides snugly between the first and second arms 51, 52 during storage (FIGS. 9A, 9B). The arms 51, 52 can include a spacer or holding bracket 54 that holds the two ends of the arms in alignment and receives the third arm therebetween as shown in FIG. 19. In some embodiments, the spacer or bracket 54 can be a snap-lock, sized and configured to hold the end portions of the arms 51, 52, and the end portion of the third arm 53e can be pinned to the forward edge portions of the first and second arms 51, 52 to allow the pivoting translation between the storage and use configurations.

Although the arm device 50 is shown in FIG. 4 as moving in an upward direction on the roller housing body 30 to the operative vertical position, the at least one arm 50 can alternatively be mounted in the reverse, e.g., to slide downwardly to the desired position.

Figure 6:
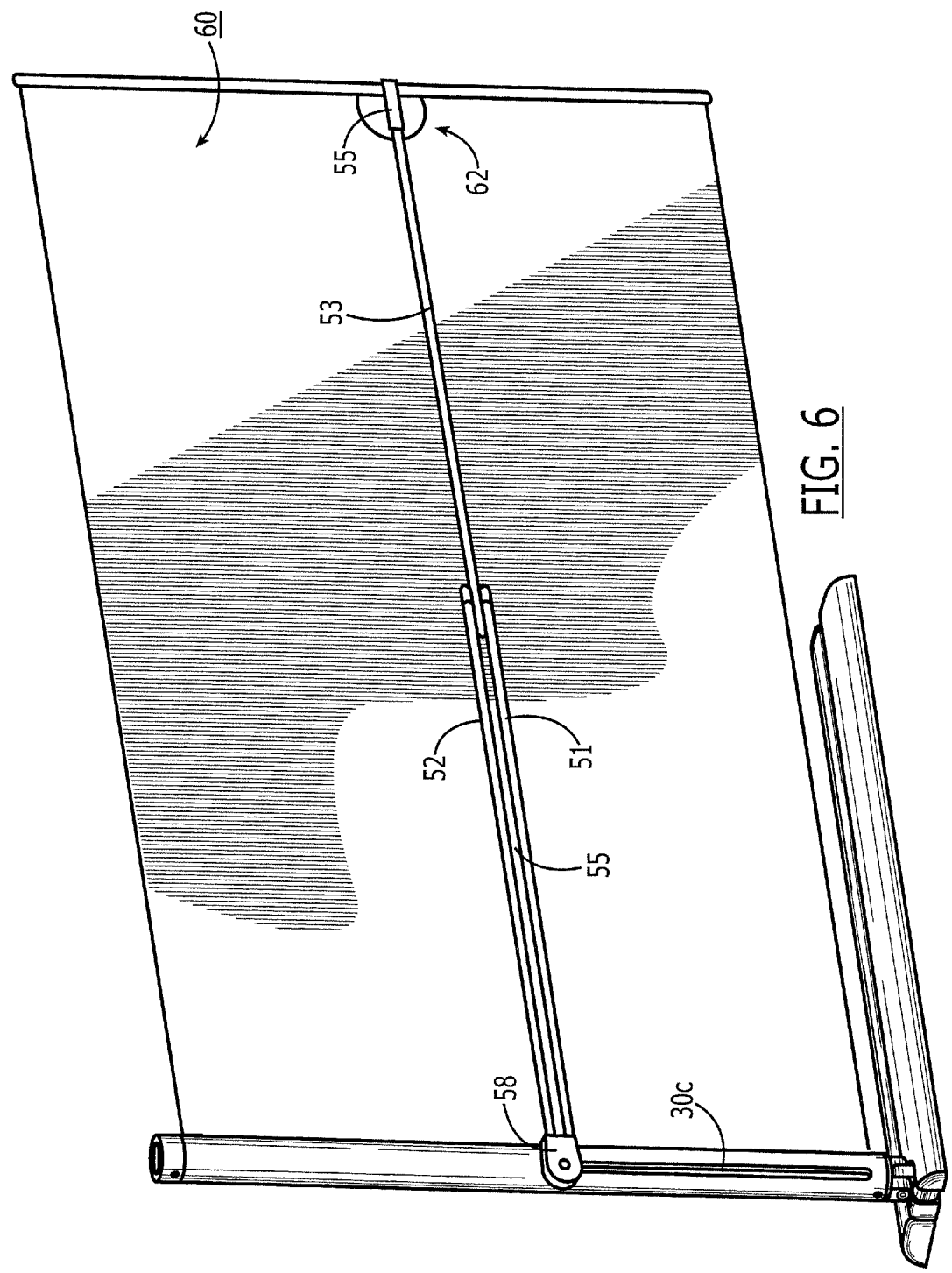
FIG. 6 is a rear perspective view of the screen assembly shown in FIG. 5 according to embodiments of the present invention.

FIGS. 5 and 6 illustrate opposing sides of the projection screen 60 in a laterally extended (operative) configuration. The projection screen 60 has a vertical axis "V" and a horizontal axis "H". FIG. 5 illustrates the front viewing surface 60s. Although the screen support arm 50 is shown as visible through the front viewing surface of the screen 60s, the screen 60 is typically opaque and would occlude viewing of the components extending across the backside thereof. FIG. 8 illustrates that the screen 60 can comprise a flexible substrate 60s attached or laminated to an optical film 60f that provides the desired screen characteristics. The film 60f is shown partially on the substrate 60s.

Figure 7:
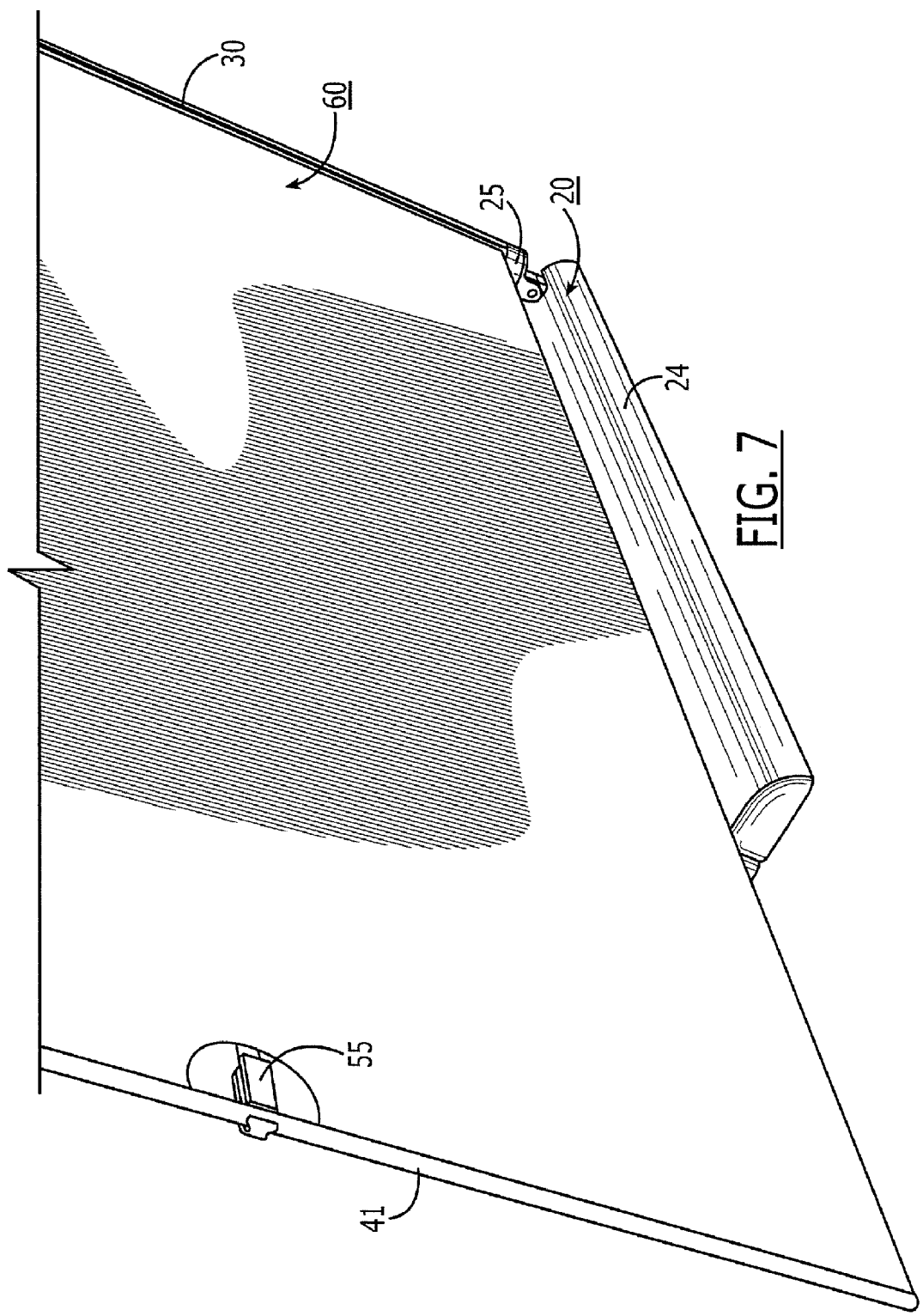
FIG. 7 is an enlarged partial front perspective view of the screen assembly shown in FIG. 4 illustrating the screen attachment to the support arm according to embodiments of the present invention.

FIGS. 5-7 also illustrate that an outer edge of the flexible screen 60 and support member 41 define an aperture 62, or the outer edge portion of the flexible screen is configured with an aperture 62, wherein, in the operative configuration, the aperture 62 is configured to reside proximate a screen holding member 55 attached to an outermost portion of the at least one screen support arm 50 (shown as member 53). The holding member 55 can be configured as a flexible member that frictionally yields to easily receive and release the screen edge 41 and hold the screen 60 extended and in lateral tension. Other screen attachment means can be used, including, for example, a hook and loop type configuration (e.g., VELCRO), a hook, adhesives and the like.

The projector screen assembly 10 can be portable and sized to provide a projector screen 60 of between about 10-100 inches diagonal (when open), while collapsing to a compact, low-profile housing (as discussed above). For example, a 30-inch diagonal, 16:9 aspect screen 60 can collapse to a 15 inch×1.5 inch×1 inch case and a 50-inch diagonal, 16:9 aspect screen can collapse to a 27 inch×2 inch×1.5 inch case. In some embodiments, the screen 60 can open to a 20-inch inch diagonal, 16:9 aspect screen configuration and close to a storage configuration of 12 inch×1 inch×0.75 inches. The screen can be configured to provide one of a 4:3 or 16:9 aspect ratio.

In some embodiments, the assembly 10 can have an ergonomic low-profile storage shape with a size that will fit into a briefcase, purse, backpack or other conventional carry or roller-based case. The casing or primary housing body can comprise a light-weight metal such as aluminum and/or polymer body.

FIGS. 9A-9H schematically illustrate exemplary screen arm support mechanisms 50 according to embodiments of the present invention. FIGS. 9A and 9B illustrate that the screen support arm 50 includes the arm pair 51, 52 and the pivoting third arm 53 as discussed above. The arm pair 51, 52 are mounted to the roller body housing 30 at mounting attachment 58 and rotate or turn to orient the arms 51, 52, laterally outward. FIG. 9A illustrates that the third arm 53 can pivot between an operative laterally extended position and storage position between the arm pair 51, 52.

FIG. 9C illustrates that the arms 51, 52 are mounted to the roller housing body 30 and rotate to extend the arms 51, 52 laterally outward away from the roller body during use. The third arm 53 can reside between the arms 51, 57 and slidably extend from a stored (retracted) position to the laterally extended position.

Figure 9D:
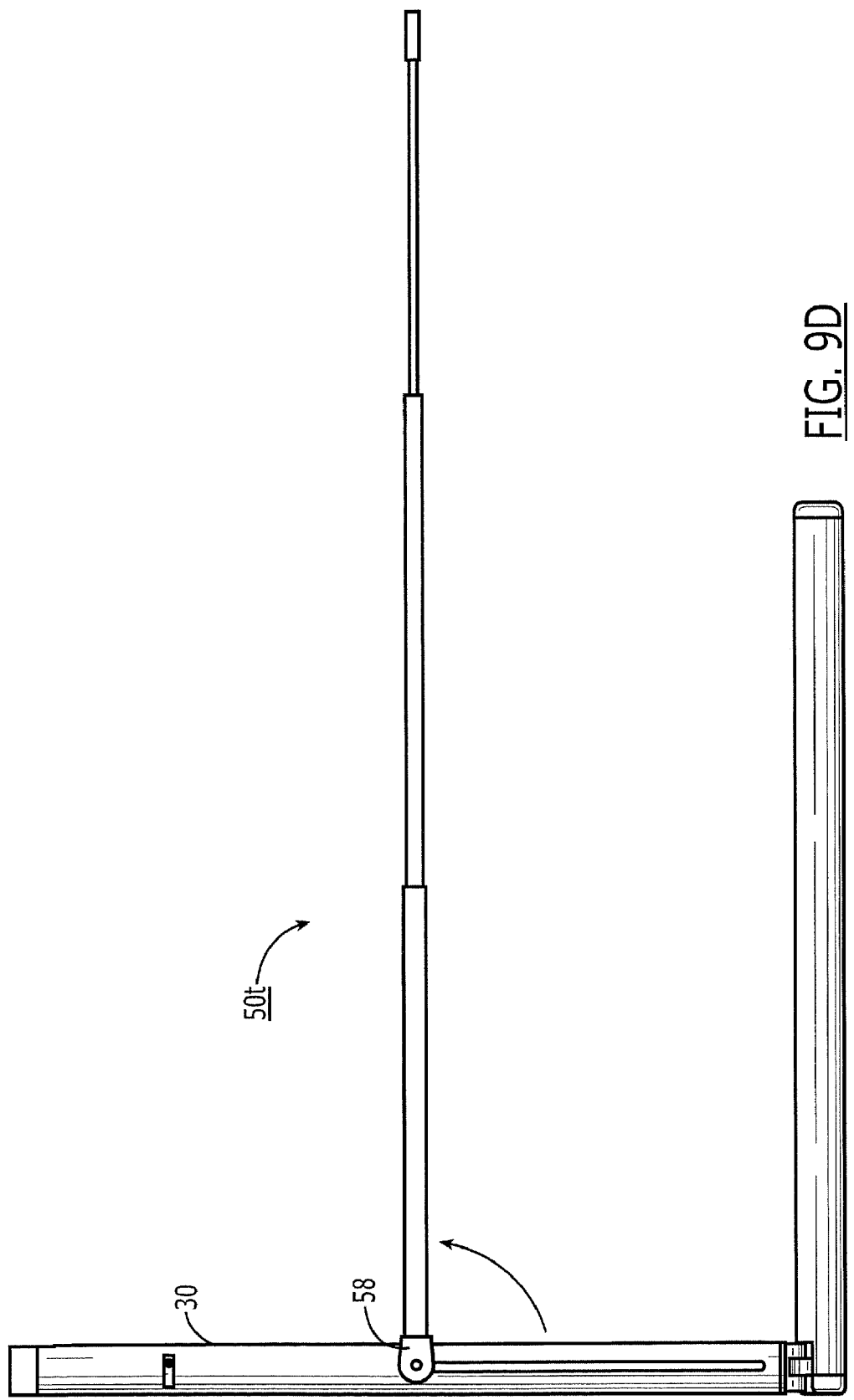
Figure 9E:
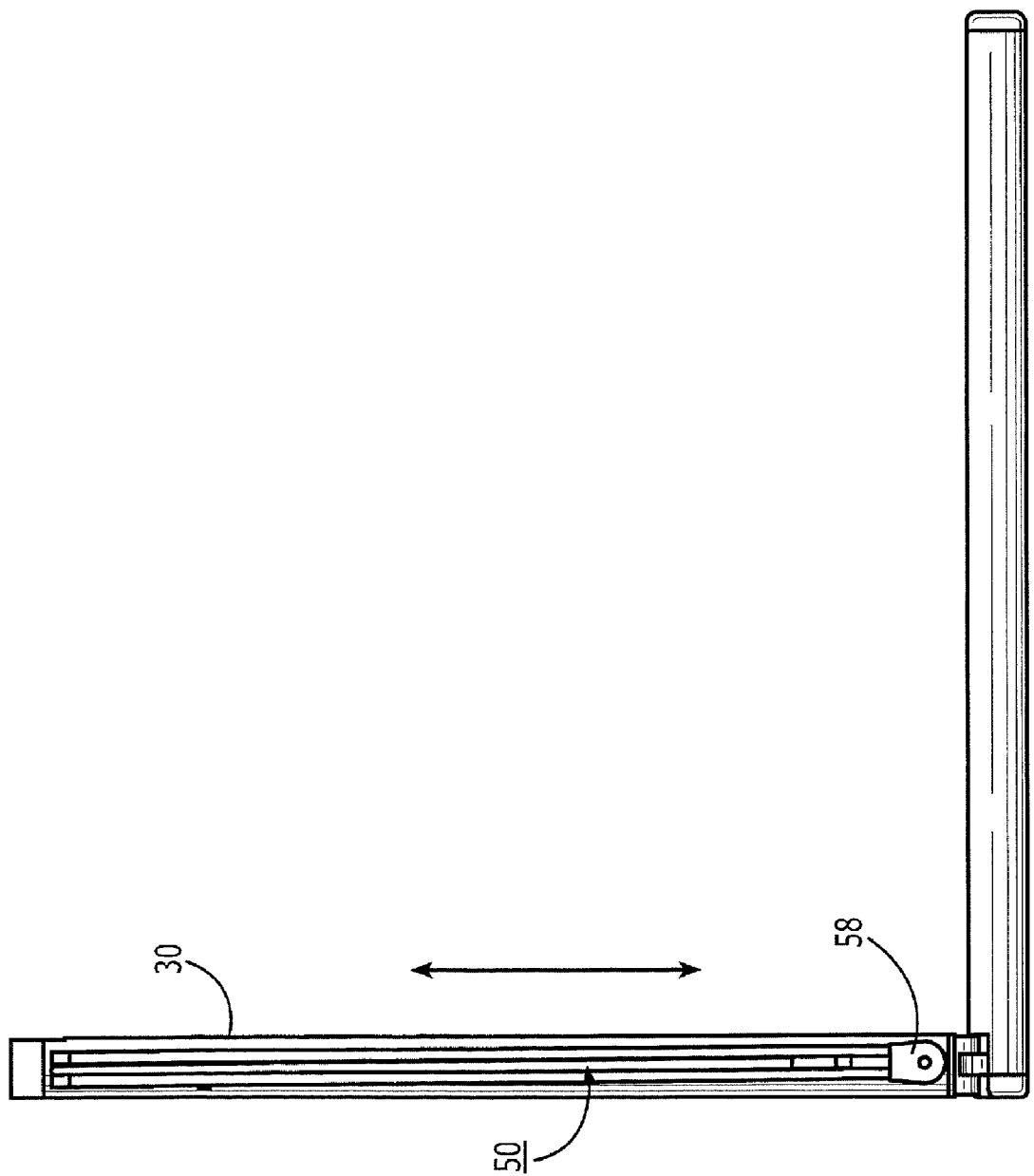
Figure 9F:
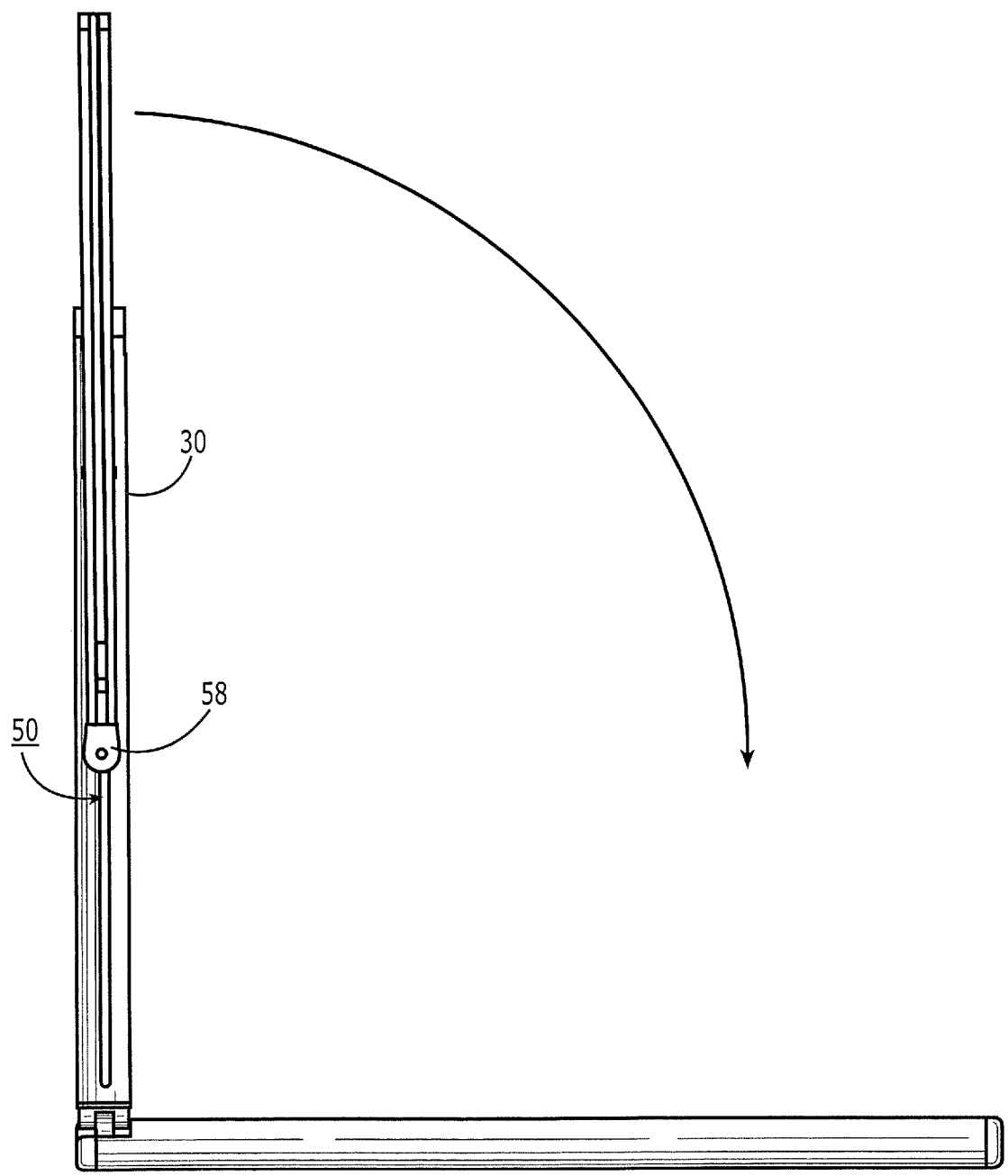
Figure 9G:
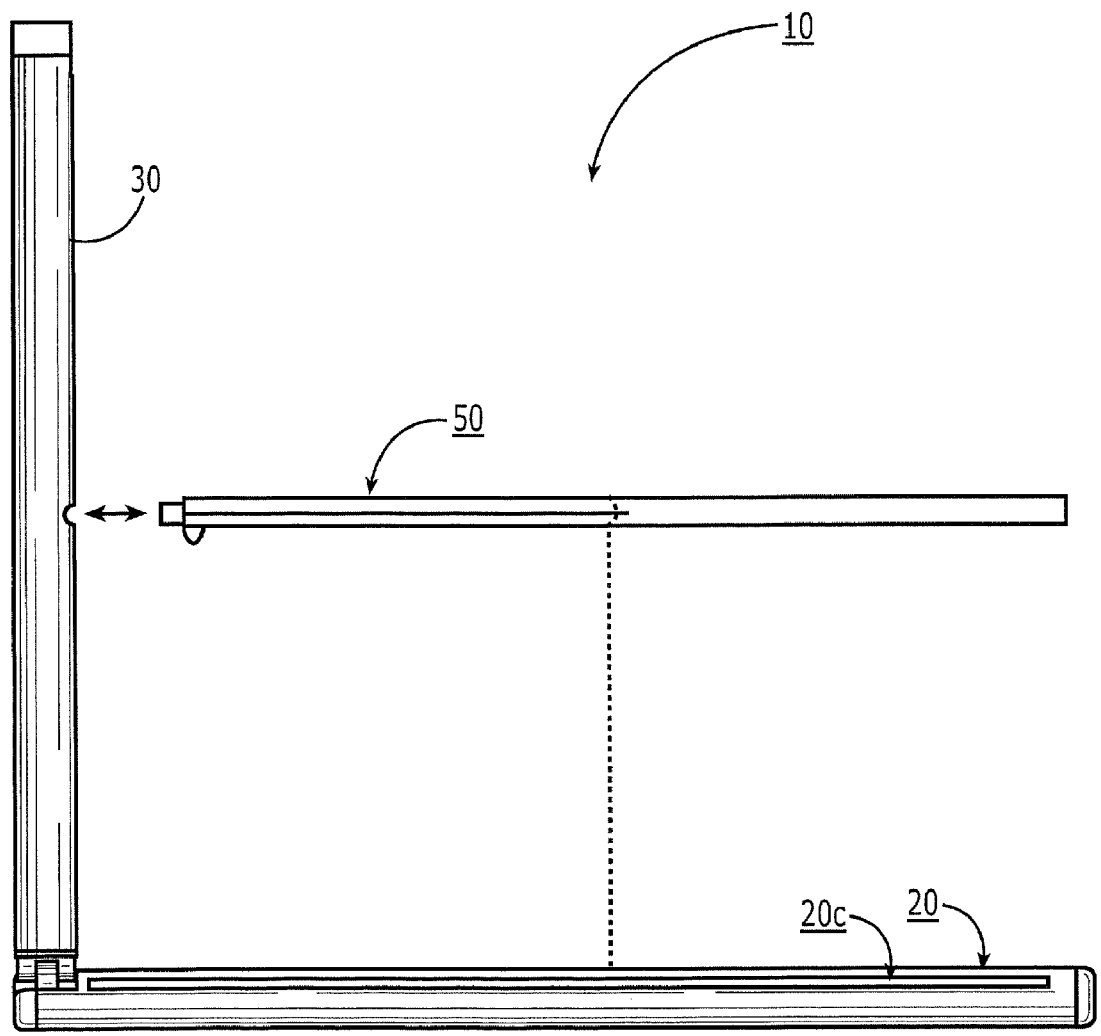
Figure 9H:
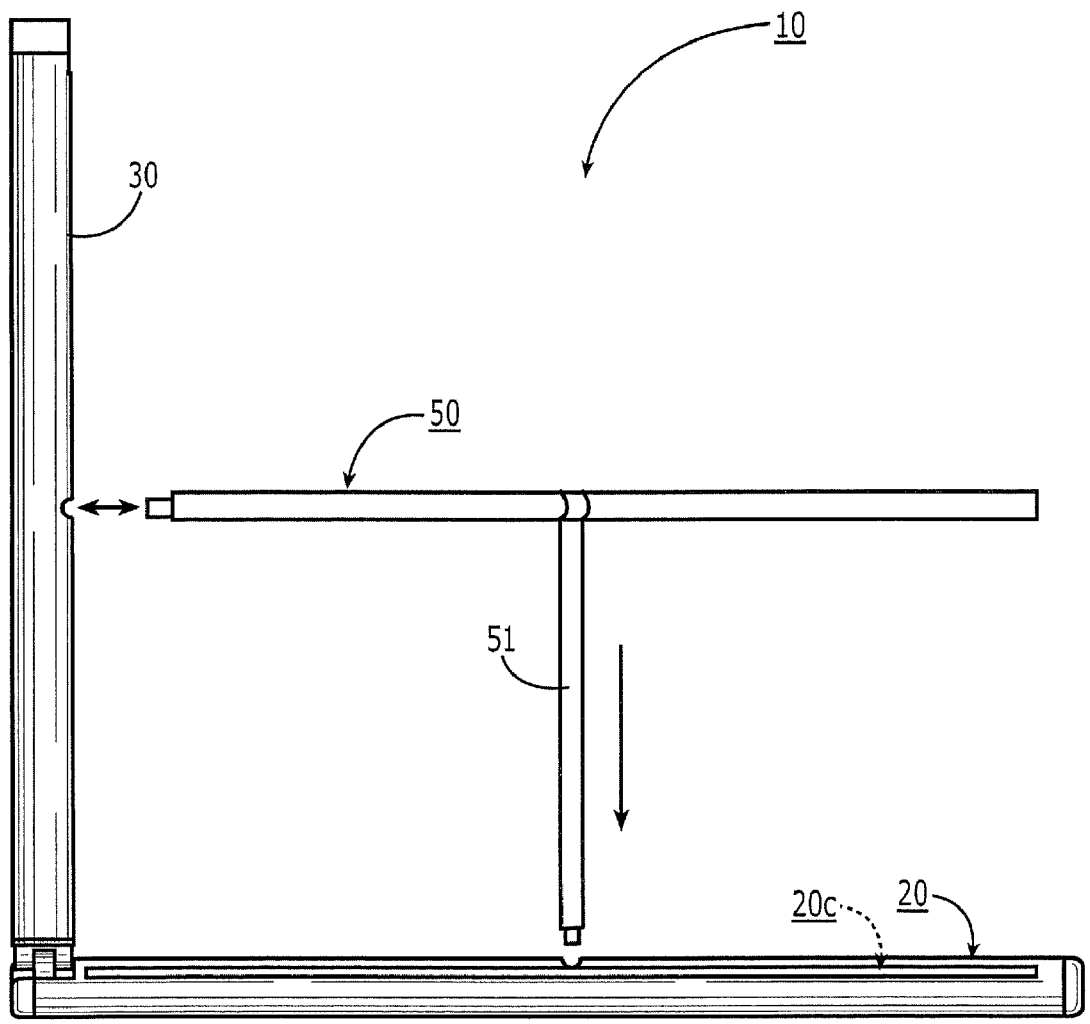

FIG. 9D illustrates that the arm 50 can be a telescoping arm 50t that is rotatably or otherwise mounted to the roller housing body 30. FIGS. 9E and 9F illustrate the arm configuration shown with respect to FIG. 3A above. FIG. 9G illustrates that the arm 50 can be releasably attachable to the roller body housing 30 (and the releasably mounting thereof can be used with any of the rotatably mounted arm configurations described herein). The releasable attachment can be any means for releasable mechanical engagement that can provide sufficient structural rigidity for the arm 50 to the roller body housing 30, such as, but not limited to, frictional engagements (e.g., "snap fit"), bayonet fittings, slot and key fittings, threaded (screw) engagements and the like. The casing 20 can include a slot or holding member that releasably holds the arm 50 during storage. FIG. 9H illustrates that the screen assembly 10 can include a supplemental vertical support 51 that engages the arm 50 at a location intermediate the screen edge 41 and the roller body housing 30. The supplemental vertical support 51 can rotatably (pivotably) mount to either the arm 50 or the casing 20 or releasably mount to each.

Figure 10:
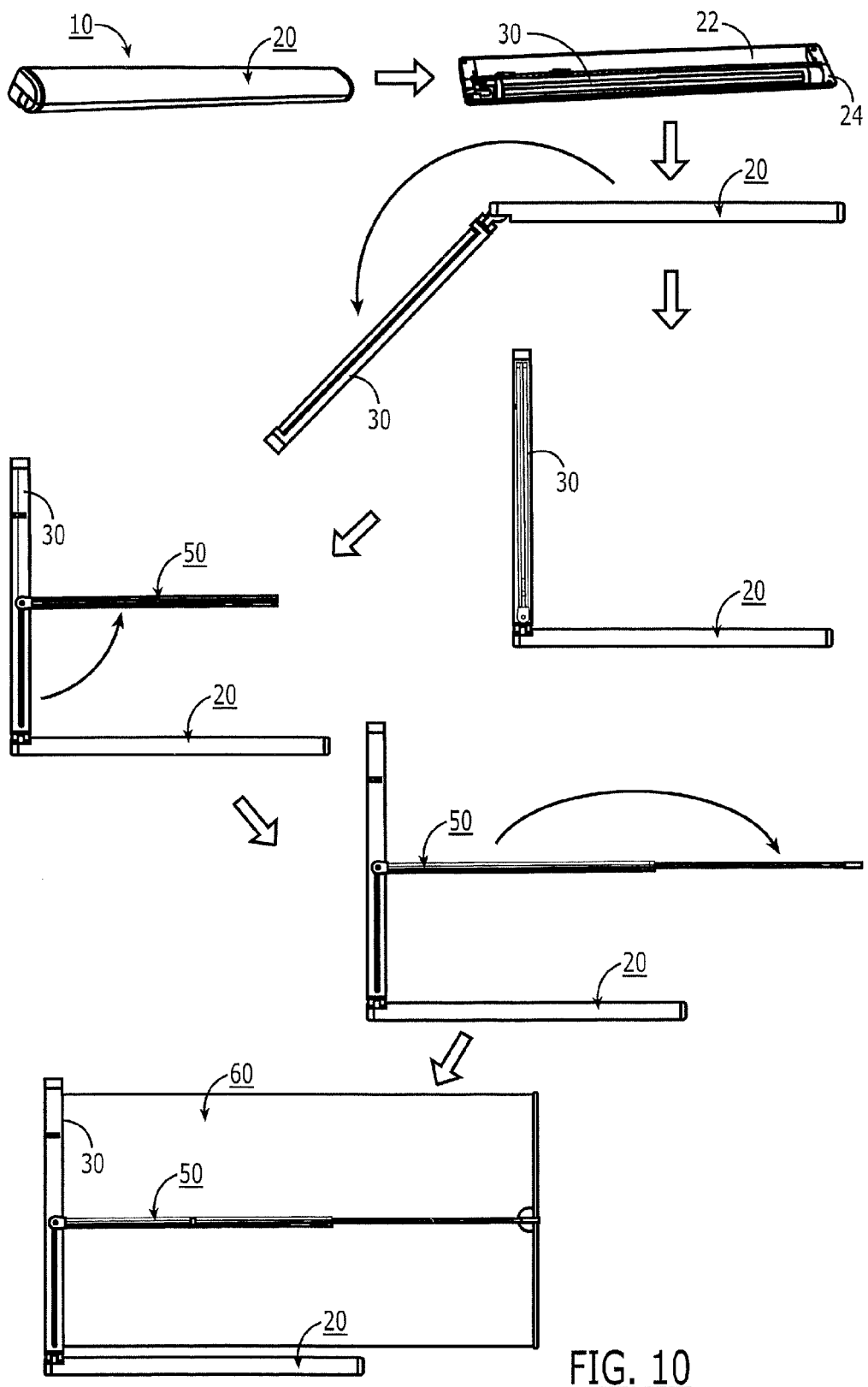
FIG. 10 schematically illustrates a series of operations that can be used to set up a portable projection screen in a viewing configuration according to some embodiments of the present invention.

FIG. 10 is a schematic illustration of operations that can be used to set-up a portable screen assembly 10 according to some embodiments of the present invention. As shown in operation 1, the casing 20 is closed. In operation 2, the case is opened to expose the roller body housing 30. In operation 3, the roller body housing 30 is rotated out of the storage cavity. In operation 4, the roller body housing is then rotated in to reside vertically above the casing 20. In operation 5, the at least one arm is laterally extended. In operation 5, in some embodiments, the arm 50 can be further laterally extended (e.g., pivoting or sliding the third arm 53 or telescopically extending a nested arm 50t). In operation 6, the screen 60 can be laterally extended and attached to the arm 50.

FIG. 11A is a partial side perspective view of the lower portion of the screen assembly 10 with the casing 20 in an open configuration and the roller body housing 30 attached to an upper portion 25u of the hinge attachment member 25. The hinge attachment member 25 is also shown with a lower portion 25l residing in a longitudinally extending opening 24o in the end portion of the casing member 24. The hinge attachment member 25 is configured to allow the roller body housing 30 to pivot as discussed above. The hinge attachment member 25 is held to the housing member 24 opening 24o via end cap 24e that snugly holds the lower portion of the pivot 25l. The upper part of the pivot 25u is held between a yoke 33 that holds the roller body 30. FIG. 12 illustrates the lower portion of the screen assembly 10 with the end caps 24e, 22e omitted from the housing members 22, 24.

Figure 11B:
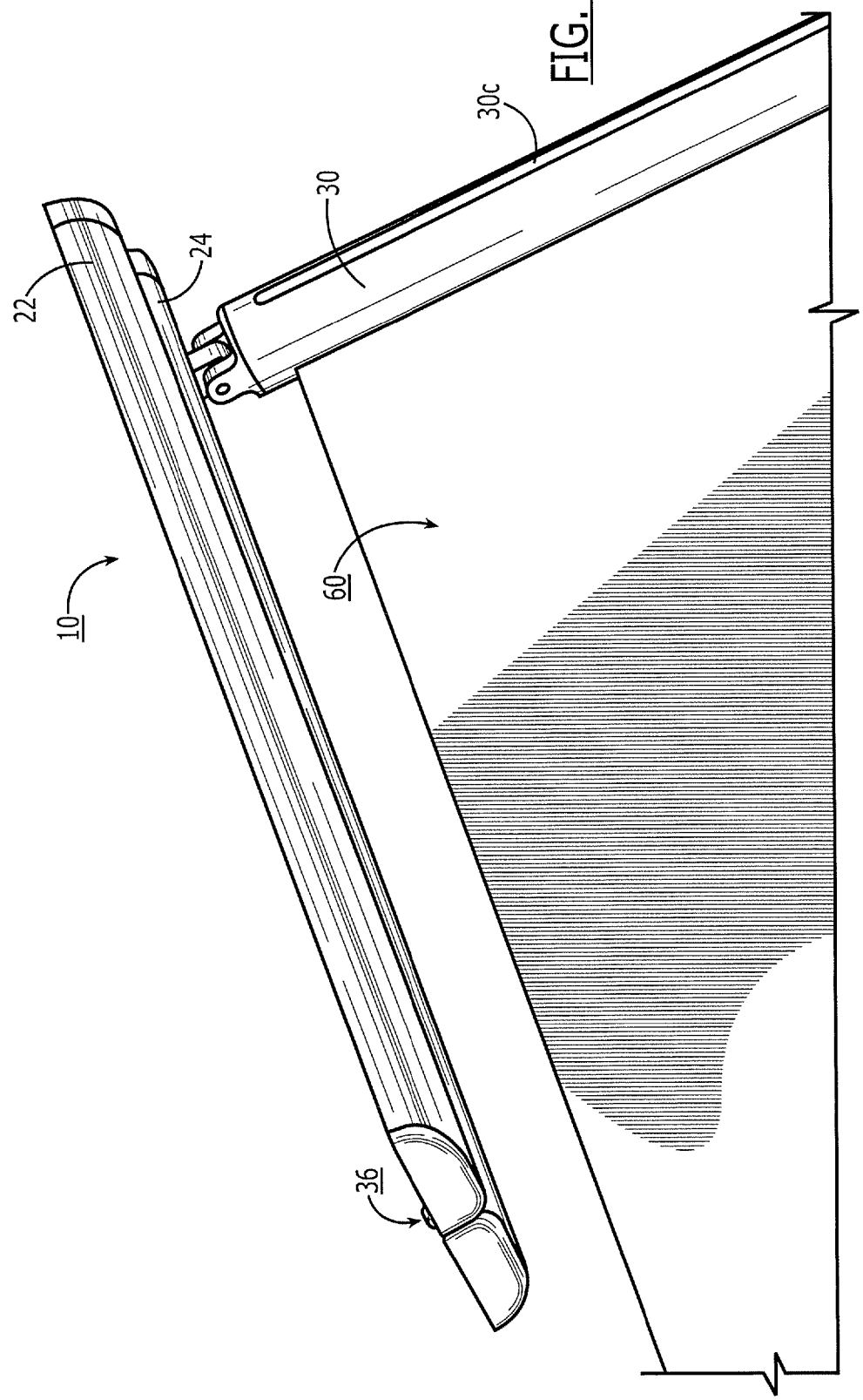
FIG. 11B is a partial bottom rear perspective view of the screen assembly shown in FIG. 11A according to embodiments of the present invention.
Figure 12:
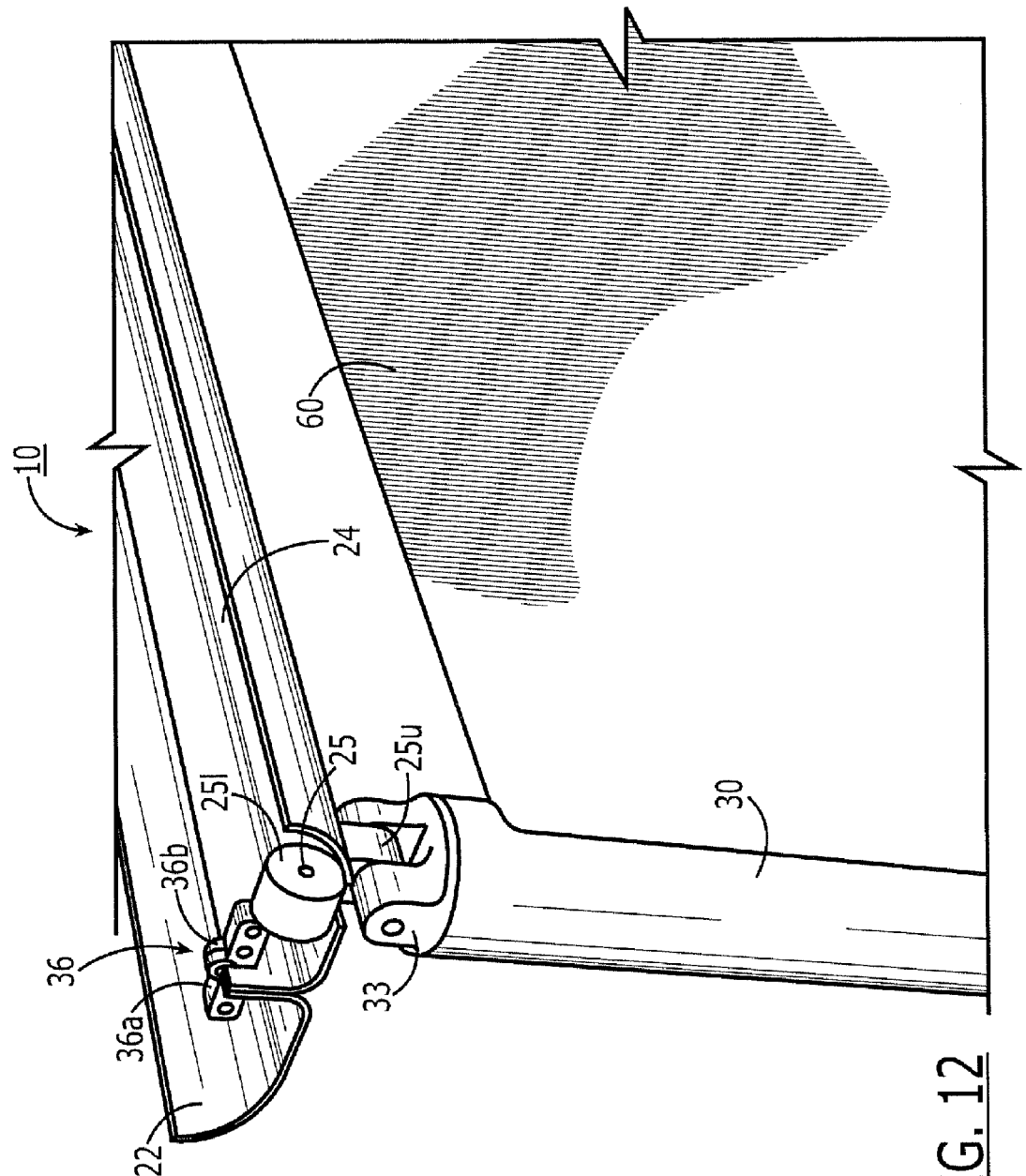
FIG. 12 is a partial bottom front perspective view of the screen assembly shown in FIG. 11A with certain components omitted for ease of discussion according to embodiments of the present invention.

FIG. 11A also illustrates the hinge assembly 36 with first and second hinges 36a, 36b attached to the adjacent inner long edges of the first and second members 22, 24 that allow that housing to pivot open and close together. A second hinge assembly 36 can be attached at an opposing end portion of the casing 20 (FIG. 11B).

Figure 13:
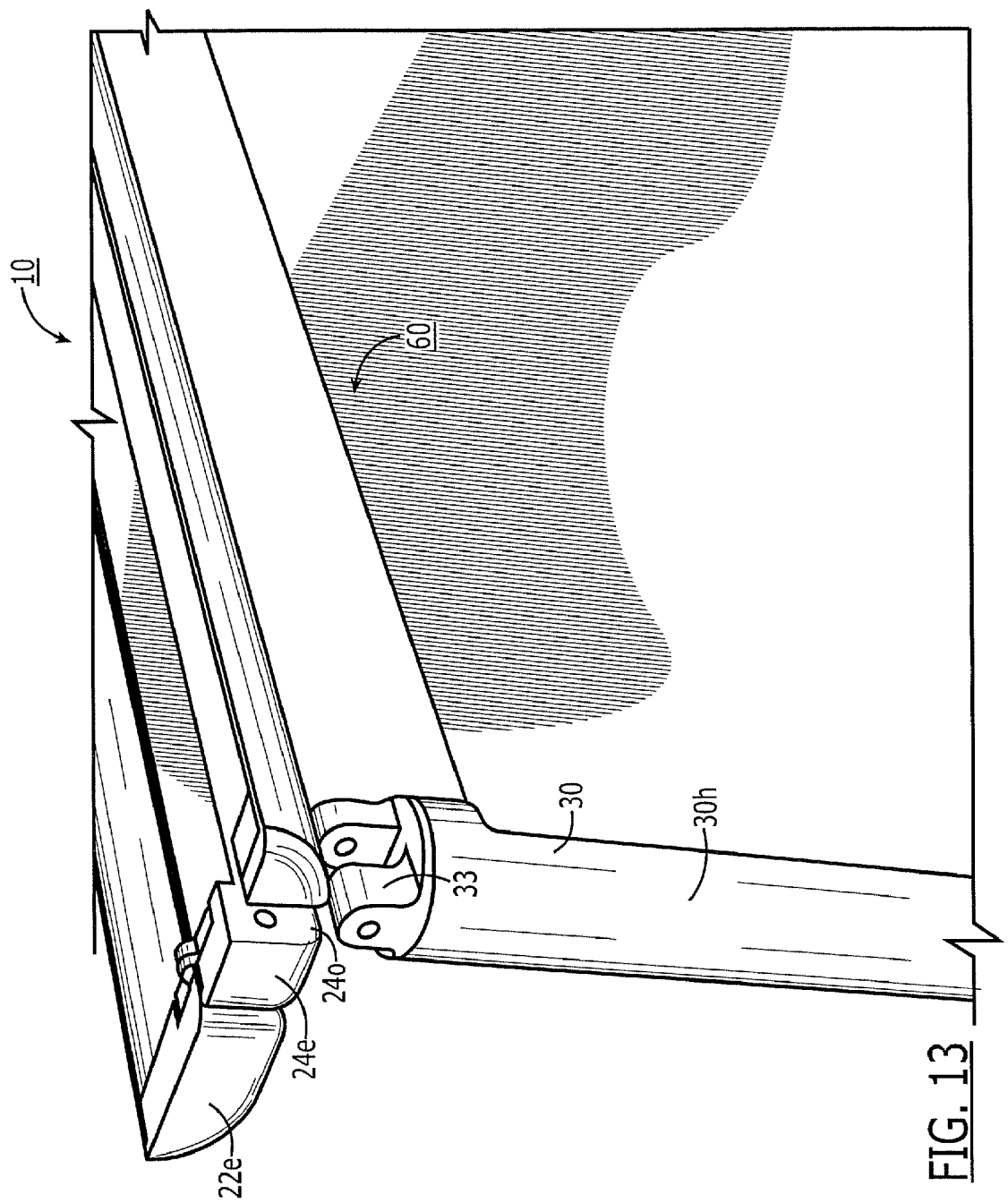
FIG. 13 is a partial bottom front perspective view of the screen assembly shown in FIG. 12 with outer casing/housing end caps in position and the hinge body omitted for ease of discussion according to embodiments of the present invention.

FIG. 13 illustrates the lower portion of the screen assembly 10 with the hinge member 25 omitted for discussion. This view illustrates that the hinge member 25 is pinned between the walls of the first housing member 24 and in the yoke 33 to allow for the rotational movement according to some embodiments.

Figure 14:
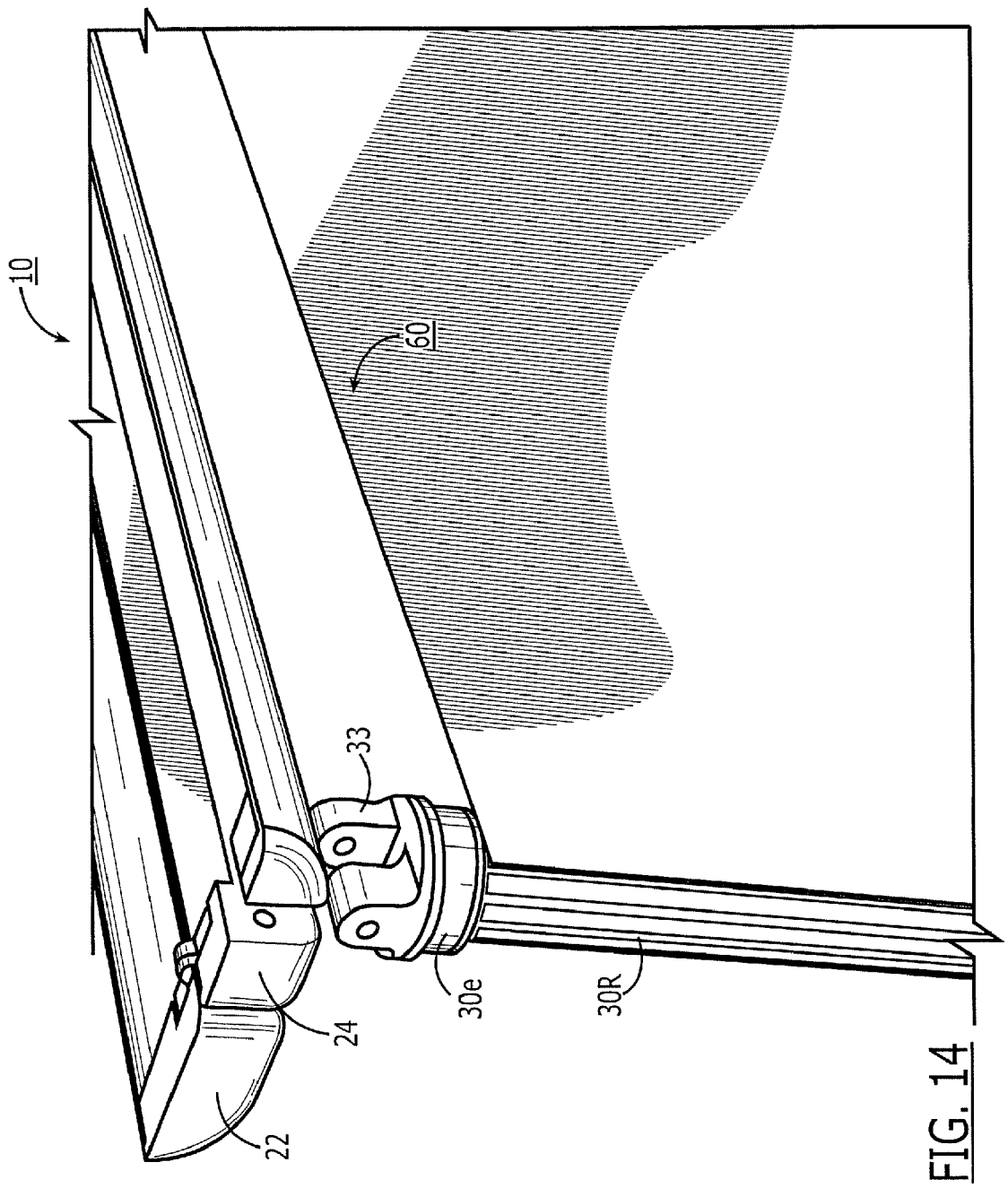
FIG. 14 is a partial bottom front perspective view of the screen assembly shown in FIG. 13 with the outer casing/housing end caps in position and the hinge body and roller housing body omitted for ease of discussion according to embodiments of the present invention.
Figure 15:
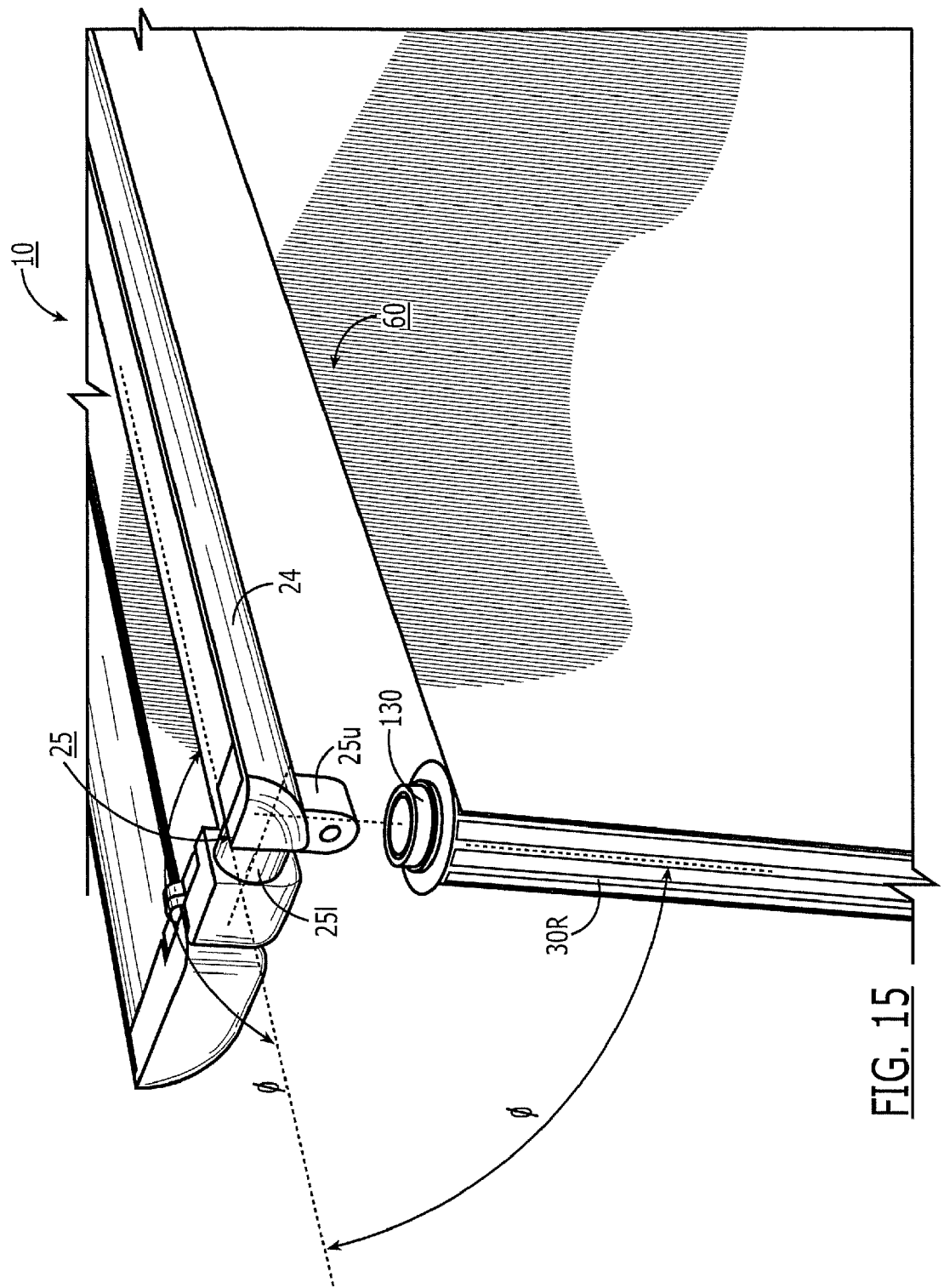
FIG. 15 is a partial bottom front perspective view of the screen assembly shown in FIG. 13 with the outer casing/housing end caps and the hinge body in position but with certain components omitted for ease of discussion including the roller housing body, roller housing body end cap (that holds the hinge body) and screen according to embodiments of the present invention.
Figure 16:
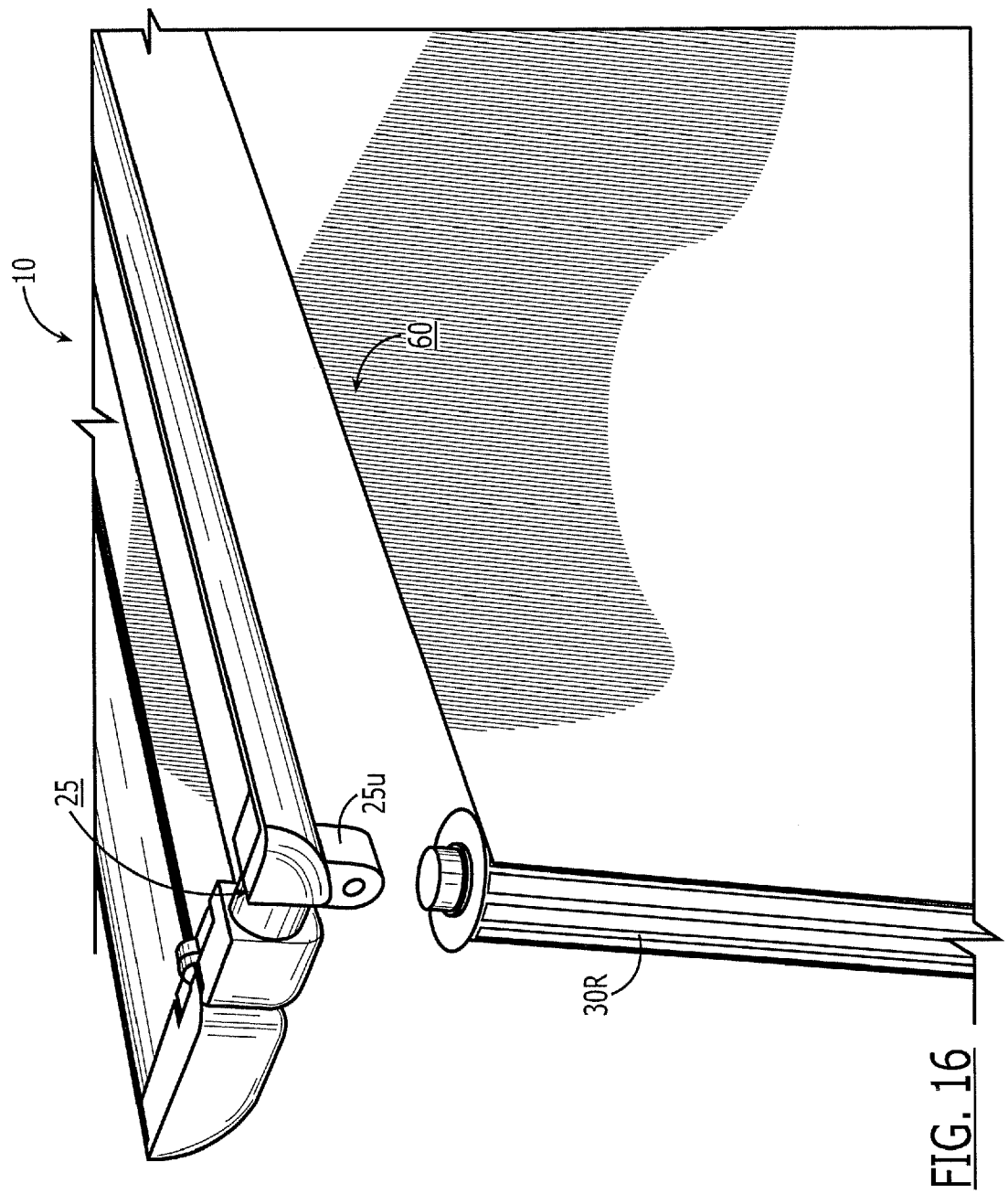
FIG. 16 is a partial bottom front perspective view of the screen assembly shown in FIG. 13 with the outer casing/housing end caps and the hinge body in position but with the roller housing and roller housing body end cap (that holds the hinge body) omitted as shown in FIG. 15 and also with the bearing omitted for ease for ease of discussion according to embodiments of the present invention.

FIG. 14 illustrates the lower portion of the screen assembly 10 with the hinge attachment member 25 and the outer roller housing 30h (FIG. 13) omitted for discussion. The roller body end cap 30e holds the roller 30R. FIG. 15 illustrates the assembly 10 with the end cap 30e omitted illustrating an underlying bearing 130. FIG. 16 illustrates the lower portion of the assembly 10 with the end cap 30e and bearing 130 omitted.

Figure 18:
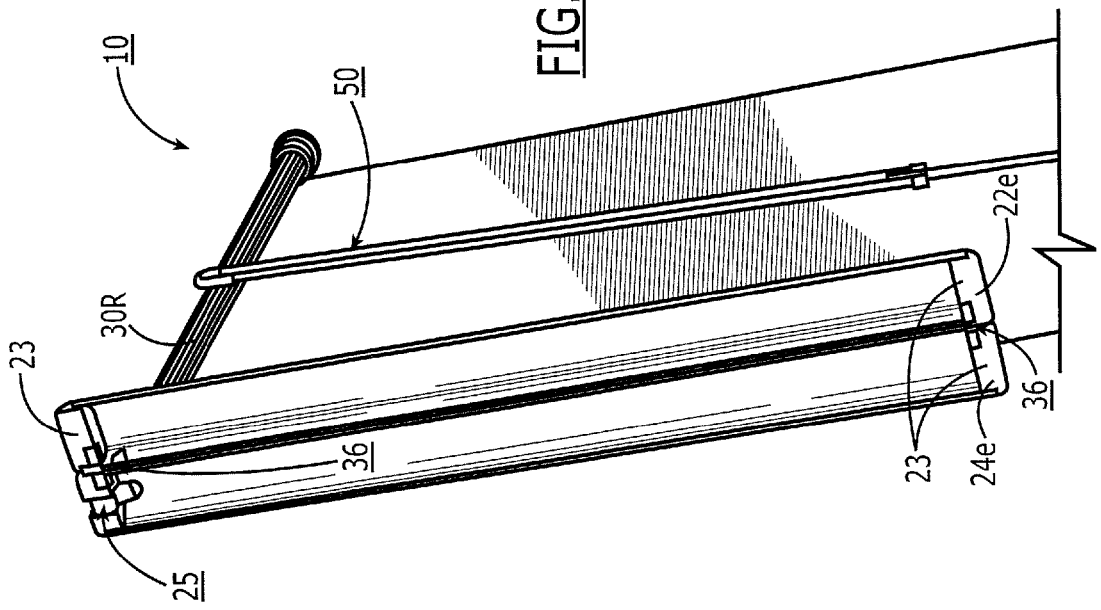
FIG. 18 is a bottom perspective view of the screen assembly of FIGS. 1, 2 and 3A with the roller body housing omitted, illustrating the support base and side-by-side elongate orientation of the outer casing or housing aligned with the lateral extension of the screen forming the support base according to embodiments of the present invention.
Figure 17:
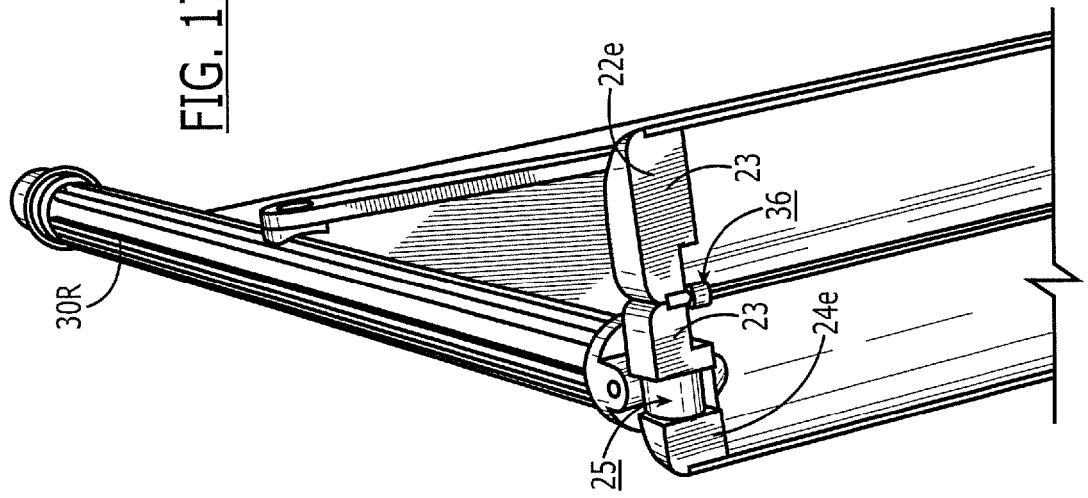
FIG. 17 is a bottom perspective view of the screen assembly shown in FIGS. 1, 2 and 3A shown with certain components including the roller housing body omitted for ease of discussion according to embodiments of the present invention.

FIGS. 17 and 18 are bottom perspective views of a portion of the screen assembly 10 illustrating that the lower portion of the assembly 10 can include substantially planar surface support portions 23 on opposing longitudinally extending end portions of the casing 20. The surface support portions 23 can be defined by the end caps 22e, 24e, and/or other members or configurations attached to the lower casing/housing 20. FIG. 19 illustrates the screen assembly 10 with the roller housing 30h in position.

Figure 20:
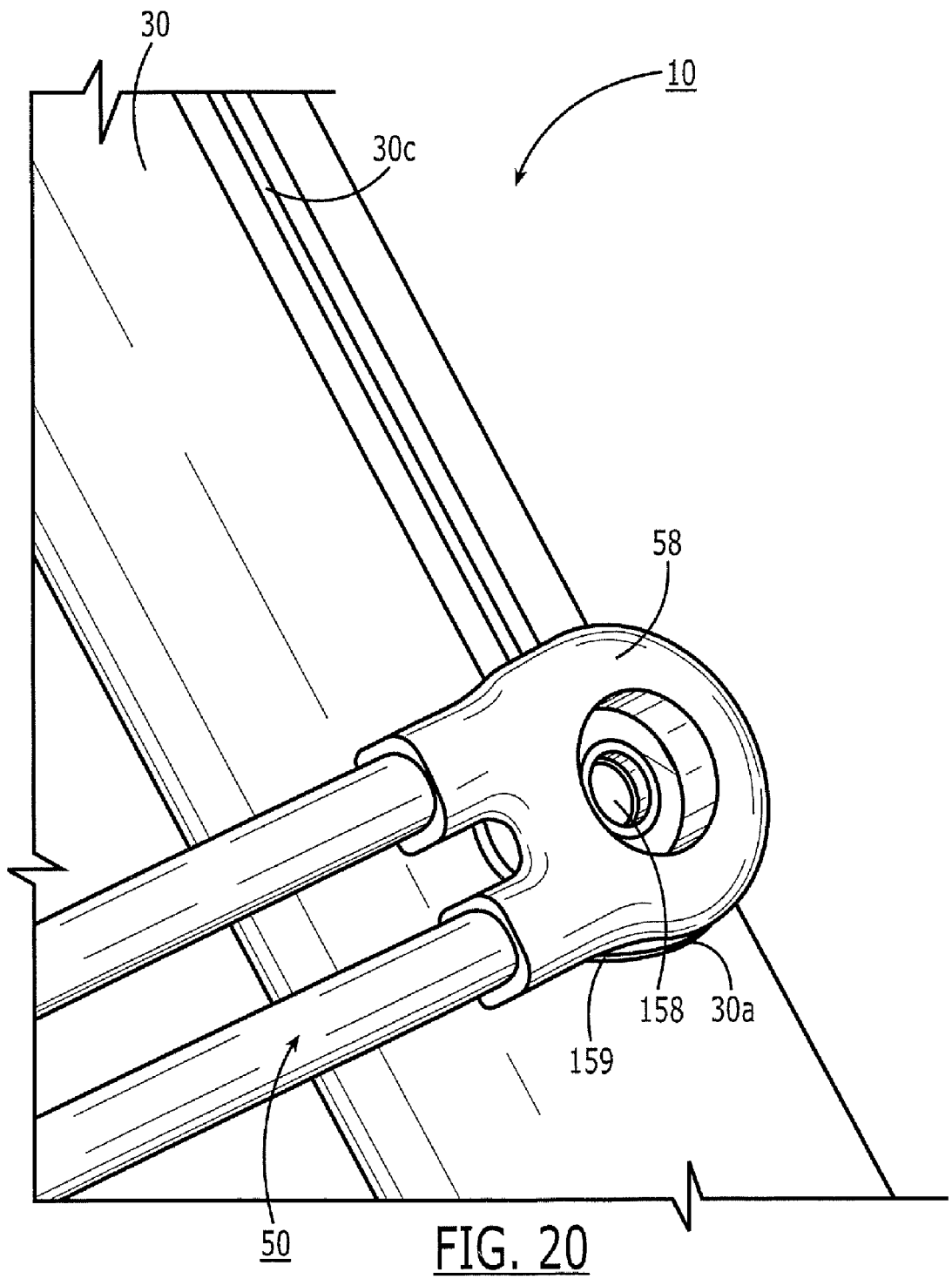
FIG. 20 is a greatly enlarged side perspective view of an exemplary rotatable mounting configuration for a screen support arm on the roller housing body according to embodiments of the present invention.

FIG. 20 is a greatly enlarged view of one embodiment of the arm mounting member 58. As shown, the roller body housing 30h includes a vertically extending channel or slot 30c and the at least one arm 50 is configured to rotate laterally outward, typically about 90 degrees, as discussed above. The arm mounting member 58 can include a "T" nut and bearing that reside in an aperture 30a in the roller body housing 30 to allow the at least one arm (shown with the dual arm pair 51, 53).

Figure 21:
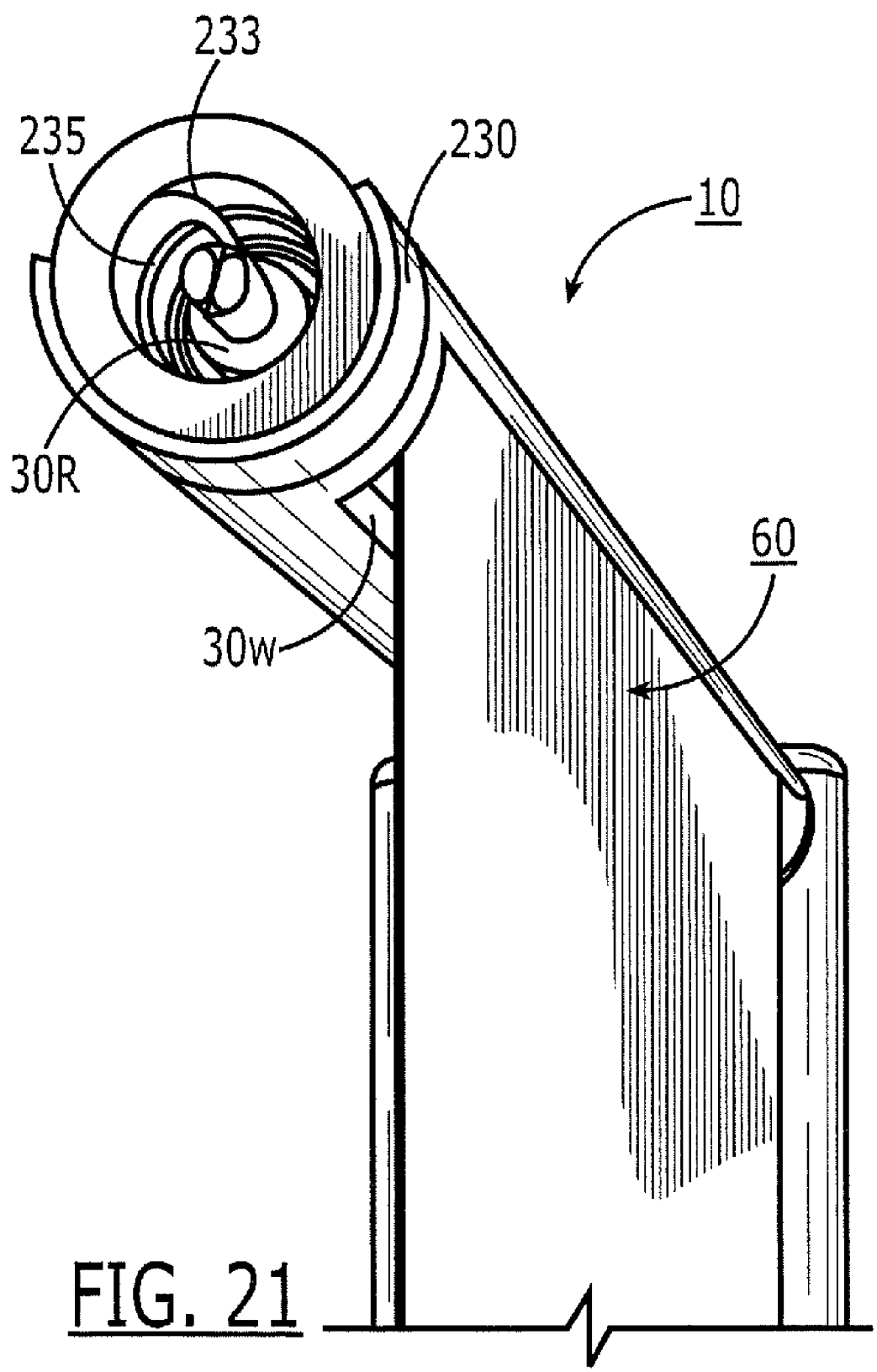
FIG. 21 is a top perspective view of the screen assembly shown in FIG. 19, shown with the upper roller housing end cap omitted for ease of discussion according to embodiments of the present invention.

FIG. 21 is a top end perspective view of the screen assembly 10 with a body tube end cap 230, a spiral spring 233, and a roller hub top 235 above the roller 30R. The roller 30R can be spring-loaded as a conventional take-up reel to hold the screen 60 as is known to those of skill in the art. The roller 30R can be held by the roller cap 230. The roller body housing 30h can include a vertically extending window 30w that allows the screen to extend and retract. The roller 30R and screen 60 can be modularly configured to allow for screen 60 upgrades for the screen assembly.

FIG. 22 illustrates that, in some embodiments, a low-lumen projection system 200 can be provided. The system 200 can include the portable screen assembly 10 and a low-lumen projector 300. The low-lumen projector 300 can be a light-weight, battery powered DLP/LED projector 300.

As described above, embodiments of the invention are directed to projector screens that are suitable for use in mixed ambient light conditions. In most homes, conference rooms, classrooms or offices, the rooms are lit with combinations of general lighting (overhead fixtures, sconces), task lighting (lamps, under-cabinet illumination) and accent lighting. Task and accent lighting dominates over general lighting. Projectors tend to be used in rooms that have more task and accent lighting—living rooms, dens, and family rooms. For the most part painted ceilings are painted shades of white that produces a slight bias to ambient illumination impinging from above. In office buildings and schools general lighting tends to prevail in the form of ceiling-mounted fluorescent units. Typically, in homes and business, light signals range from about 50 lux (a darkish living room corner) to about 550 lux—a bright window-lit office and all points in between.

The maximum illuminance of a projection screen 60 is dependent on the luminance of the projector, the size of the projected image and the gain of the screen. Table 1 below shows examples of illumination that will be reflected when various size projection screens are illuminated with the luminous output of projectors of varying brightness. Signals that are between 200 and 1000 NITs (shown emphasized in Tables 1 and 2) are those that can be seen in a lit indoor room. Table 1 illustrates that low luminance projectors with low-gain screens are problematic for use in brightly lit rooms.

TABLE 1

Projection Screen Illuminance (Gain 1)

| Diagonal (4:3)" | Projector Output (Øv) | | | | | |
|---|---|---|---|---|---|---|
| | 25 | 50 | 100 | 500 | 1000 | 1500 |
| 20 | 64.24 | 128.48 | 256.97 | 1284.85 | 2569.69 | 3854.54 |
| 30 | 28.55 | 57.10 | 114.21 | 571.04 | 1142.09 | 1713.13 |
| 40 | 16.06 | 32.12 | 64.24 | 321.21 | 642.42 | 963.64 |
| 50 | 10.28 | 20.56 | 41.12 | 205.58 | 411.15 | 616.73 |
| 60 | 7.14 | 14.28 | 28.55 | 142.76 | 285.52 | 428.28 |
| 70 | 5.24 | 10.49 | 20.98 | 104.89 | 209.77 | 314.66 |
| 80 | 4.02 | 8.03 | 16.06 | 80.30 | 160.61 | 240.91 |
| 90 | 3.17 | 6.34 | 12.69 | 63.45 | 126.90 | 190.35 |
| 100 | 2.57 | 5.14 | 10.28 | 51.39 | 102.79 | 154.18 |

For projection screens, gain can be particularly important in uncontrolled light viewing environments because sufficient gain can allow almost any projector to achieve on-axis luminance that exceeds the on-axis output of most other display systems. The highlighted regions of Tables 1 and 2 show the luminance-gain combinations projector and screen that deliver image illumination equivalent or superior to the image illumination of other popular display technologies (LCD, Plasma, rear-projection TV, CRT).

TABLE 2

Gain-Adjusted Luminance of projection Screens (Gains 3, 5 and 7)

| Diagonal (4:3)" | 25 | 50 | 100 | 500 | 1000 | 1500 |
|---|---|---|---|---|---|---|
| | Projector Output (Øv) Gain = 3 | | | | | |
| 20 | 192.73 | 385.45 | 770.91 | 3854.54 | 7709.08 | 11563.62 |
| 30 | 85.66 | 171.31 | 342.63 | 1713.13 | 3426.26 | 5139.39 |
| 40 | 48.18 | 96.36 | 192.73 | 963.64 | 1927.27 | 2890.91 |
| 50 | 30.84 | 61.67 | 123.35 | 616.73 | 1233.45 | 1850.18 |
| 60 | 21.41 | 42.83 | 85.66 | 428.28 | 856.56 | 1284.85 |
| 70 | 15.73 | 31.47 | 62.93 | 314.66 | 629.31 | 943.97 |
| 80 | 12.05 | 24.09 | 48.18 | 240.91 | 481.82 | 722.73 |
| 90 | 9.52 | 19.03 | 38.07 | 190.35 | 380.70 | 571.04 |
| 100 | 7.71 | 15.42 | 30.84 | 154.18 | 308.36 | 462.54 |
| | Gain = 5 | | | | | |
| 20 | 321.21 | 642.42 | 1284.85 | 6424.24 | 12848.47 | 19272.71 |
| 30 | 142.76 | 285.52 | 571.04 | 2855.22 | 5710.43 | 8565.65 |
| 40 | 80.30 | 160.61 | 321.21 | 1606.06 | 3212.12 | 4818.18 |
| 50 | 51.39 | 102.79 | 205.58 | 1027.88 | 2055.76 | 3083.63 |
| 60 | 35.69 | 71.38 | 142.76 | 713.80 | 1427.61 | 2141.41 |
| 70 | 26.22 | 52.44 | 104.89 | 524.43 | 1048.85 | 1573.28 |
| 80 | 20.08 | 40.15 | 80.30 | 401.51 | 803.03 | 1204.54 |
| 90 | 15.86 | 31.72 | 63.45 | 317.25 | 634.49 | 951.74 |
| 100 | 12.85 | 25.70 | 51.39 | 256.97 | 513.94 | 770.91 |

TABLE 2-continued

Gain-Adjusted Luminance of projection Screens (Gains 3, 5 and 7)

| Diagonal (4:3)" | 25 | 50 | 100 | 500 | 1000 | 1500 |
|---|---|---|---|---|---|---|
| | Projector Output (LØv) Gain = 7 | | | | | |
| 20 | 449.70 | 899.39 | 1798.79 | 8993.93 | 17987.86 | 26981.79 |
| 30 | 199.87 | 399.73 | 799.46 | 3997.30 | 7994.60 | 11991.91 |
| 40 | 112.42 | 224.85 | 449.70 | 2248.48 | 4496.97 | 6745.45 |
| 50 | 71.95 | 143.90 | 287.81 | 1439.03 | 2878.06 | 4317.09 |
| 60 | 49.97 | 99.93 | 199.87 | 999.33 | 1998.65 | 2997.98 |
| 70 | 36.71 | 73.42 | 146.84 | 734.20 | 1468.40 | 2202.60 |
| 80 | 28.11 | 56.21 | 112.42 | 562.12 | 1124.24 | 1686.36 |
| 90 | 22.21 | 44.41 | 88.83 | 444.14 | 888.29 | 1332.43 |
| 100 | 17.99 | 35.98 | 71.95 | 359.76 | 719.51 | 1079.27 |

In the same way that a laptop computer screen has a narrower vertical region to accommodate a dimmer, lower-power backlight, high-gain projection screens can harvest light from the edges of the viewing field and concentrate it in the center of the viewing field. The tradeoff is that the image becomes dimmer as the viewer moves off axis.

In some embodiments, the projector screens 60 can comprise a film or a flexible thin substrate, alone, laminated or otherwise attached and/or combined with a second material. The viewing surface 60s can include arrays of miniaturized lenses that provide high-gain in low light or ambient light conditions. The lenses can be microlenses that create light distribution using aspheric, astigmatic, cylindrical and/or other precision-shaped patterns of lenses.

In some embodiments of the present invention, the refractive layer comprises an array of anamorphic lenses. The spatial frequency of the reflective layer can be higher than the spatial frequency of the refractive layer. In other embodiments, however, this relationship may be reversed, as long as the first and second spatial frequencies are different from one another. For additional exemplary screen materials and configurations, see, co-pending co-assigned U.S. patent application Ser. No. 11/179,162, the contents of which are hereby incorporated by reference as if recited in full herein.

Although specific embodiments of the present invention have been disclosed for illustrative purposes, those skilled in the art will appreciate that various modifications, additions and substitutions are possible, without departing from the scope and spirit of the invention as disclosed in the accompanying claims.

That which is claimed:

1. A portable projection screen assembly, comprising:
a roller housing holding a roller with a flexible projection screen;
at least one substantially laterally extending screen support arm attached to the roller housing, wherein the at least one screen support arm is configured to hold an outer edge portion of the flexible projection screen when the projection screen is in a laterally extended configuration; and
an outer housing case having an interior cavity sized and configured to hold the roller housing therein in a storage configuration, wherein the roller housing is hingeably attached or releasably attached to the housing case and resides substantially vertically above the outer case in an operative position, whereby the outer housing case defines a support base adapted to reside on a support surface.

2. The screen assembly of claim 1, wherein the at least one screen support arm is rotatably attached to the roller housing whereby the at least one screen support arm is configured to rotate from a substantially longitudinally extending storage configuration adjacent to or in the roller housing to the substantially laterally extending operative configuration.

3. The screen assembly of claim 1, wherein the at least one screen support arm comprises a pair of closely spaced apart substantially parallel screen support arms having first and second opposing end portions, the first end portions being rotatably attached to the roller housing, and wherein the at least one screen support arm further comprises a third screen support arm that is held between the pair of screen support arms in a storage configuration and is held so that at least a major portion of a length of the third support arm extends laterally outward away from the pair of screen support arms when in an operative configuration.

4. The screen assembly of claim 3, wherein the third screen support arm has first and second opposing end portions with the first end portion being pivotably attached to at least one of the second end portions of the pair of screen support arms, wherein the third screen support arm is configured to rotate between the stored configuration to the operative configuration, and wherein the second end portion of the third screen support arm is releasably attached to the outer edge portion of the flexible screen and/or a vertically extending support bar affixed to an outer edge portion of the flexible screen.

5. The screen assembly of claim 1, wherein the flexible screen has a vertical support member attached to an outer edge portion thereof, and wherein either (a) the outer edge portion of the flexible screen and the vertical support member define an aperture or (b) the outer edge portion of the flexible screen comprises an aperture, wherein, in the operative laterally extended configuration, the aperture is configured to reside proximate a screen holding member attached to the at least one screen support arm.

6. The screen assembly of claim 1, wherein the casing housing has first and second matable elongate housing members that are pivotably attached to each other to (a) translate open about 180 degrees to expose an interior cavity and the roller housing and define the support base and (b) close together and matably attach to encase the roller housing therein in a storage configuration, wherein when open, the first and second housing members comprise flat perimeter surfaces surrounding interior cavities that face downward and define the support base adapted to contact a substantially horizontal support surface during operative use.

7. The screen assembly of claim 1, further comprising a pivot attachment member having upper and lower pivot attachment portions, wherein a lower end portion of the roller housing is pivotably attached to the upper pivot attachment portion and the lower pivot attachment portion cooperates with an end portion of the outer casing housing so as to be able to rotate the roller housing into and out of the interior cavity of the outer casing housing and into the vertical operative position.

8. The screen assembly of claim 1, wherein the roller housing comprises a longitudinally extending slot or channel sized and configured to receive the at least one screen support arm.

9. The screen assembly of claim 1, wherein, in a closed storage configuration, the casing housing is compact and has length×width×height measurements of about 12 in ×1 in ×0.75 in or less, and wherein, in a viewing configuration the screen has a diagonal screen size of about 20 inches.

10. The screen assembly of claim 1, wherein the projection screen is held laterally extended in tension in a viewing configuration, and wherein the projection screen is a high Ambient Rejection Ratio (ARR), high-contrast, and high-gain screen.

11. A portable projection screen assembly, comprising:
a first elongate housing member having an axially extending elongate interior channel;
a second elongate housing member attached to the first elongate housing member, the second housing member having an axially extending elongate interior channel, wherein the first and second housing members matably attach to define a closed configuration whereby at least a major portion of a length of each of the respective interior channels is aligned with each other to define an interior cavity, and wherein the first and second housing members are configured to define an open configuration whereby the first and second housing members reside side-by-side to expose the respective interior channels and define a support base;
a roller housing holding a roller therein, the roller housing pivotably attached to one end portion of the first housing member whereby the roller housing resides in the interior cavity when the first and second housing members are in the closed configuration and extends above the first and second housing members in an operative position when the first and second housing members are in the open configuration;
at least one screen support arm having first and second opposing end portions, the first end portion being rotatably attached to the roller housing whereby the at least one screen support arm rotates from a longitudinally extending storage position that is in or adjacent the roller housing to an outwardly extending operative position; and
a flexible projection screen mounted on the roller and configured to laterally roll and unroll between stored and operative positions, the projection screen having a high gain and a high Ambient Rejection Ratio (ARR), wherein, in the operative position, an outer edge portion of the flexible projection screen is attached to the at least one screen support arm,
wherein, in the operative position, the roller housing extends substantially vertically above the support base that resides on a support surface, and wherein the at least one screen support arm extends substantially laterally outwardly substantially orthogonal to the roller housing to hold the flexible screen laterally extended.

12. The screen assembly of claim 11, wherein the at least one screen support arm comprises a pair of closely spaced apart substantially parallel screen support arms having first and second opposing end portions, the first end portions being rotatably attached to the roller housing, and wherein the at least one screen support arm comprises a third screen support arm that is held between the pair of screen support arms when in a storage configuration and is held so that at least a major portion of a length of the third support arm extends laterally outward away from the pair of screen support arms when in an operative configuration.

13. The screen assembly of claim 12, wherein the third screen support arm has first and second opposing end portions with the first end portion being pivotably attached to at least one of the second end portions of the pair of screen support arms, wherein the third screen support arm is configured to rotate between the stored configuration to the operative configuration whereby the second end portion is attached to an outermost perimeter edge portion of the flexible screen and/or a vertically extending support bar attached to the outermost perimeter edge portion of the flexible screen.

14. The screen assembly of claim 11, wherein the flexible screen has a vertical support member with increased rigidity compared to the flexible screen attached to an outer edge portion thereof, wherein either (a) the outer edge of the flexible screen and support member define an aperture or (b) the outer edge portion of the flexible screen has an aperture, wherein, in the operative configuration, the aperture is configured to reside proximate a screen holding member attached to an outer portion of the at least one screen support arm.

15. A method of setting up a portable projection screen assembly, comprising:
- providing a flexible projection screen held on a roller in a roller housing inside a casing cavity having matably attached hinged first and second elongate housing members;
- opening the first and second housing members to expose the roller housing;
- pivoting the roller housing out of an end portion of the first housing member to an upstanding substantially vertical position;
- extending at least one screen support arm outwardly from the roller housing;
- laterally extending the flexible projection screen from the roller housing to a viewing configuration; attaching the at least one screen support arm to an outer edge portion of the flexible screen; and
- placing the casing cavity face down on a support surface to thereby provide a projector screen support base that supports the flexible screen in the viewing configuration.

16. A method according to claim 15, wherein the extending the at least one screen support arm comprises telescopically extending the at least one arm substantially laterally away from the roller housing to attach to the screen in the viewing configuration.

17. A method according to claim 15, wherein the at least one arm comprises three arms, including closely spaced apart first and second arm pairs and a third arm translatable thereto held retracted and between the first and second arms in the storage configuration.

18. A low lumen portable projector system with a projection screen assembly, comprising:
- a portable low-lumen projector; and
- a projection screen assembly adapted to receive light and images from the portable low-lumen projector, the assembly comprising:
    - a roller housing holding a roller with a flexible projection screen therein so that the flexible screen can roll and unroll therefrom;
    - at least one screen support arm rotatably attached to the roller housing, wherein the at least one screen support arm is configured to rotate from a substantially longitudinally extending storage configuration to a substantially laterally extending operative configuration; and
    - an outer case housing pivotably attached to a lower end portion of the roller housing, the outer case housing having an interior cavity sized and configured to hold the roller housing therein in a storage configuration, wherein the roller housing is configured to rotate out of the interior cavity and reside vertically above the outer case in an operative position whereby the outer case defines a support base for the roller housing and screen.

19. A system according to claim 18, wherein the low lumen projector is a microprojector.

20. A system according to claim 18, wherein the flexible projection screen is a high Ambient Rejection Ratio (ARR), high-contrast, and high-gain screen.

* * * * *